(12) United States Patent
Ito

(10) Patent No.: US 9,008,360 B2
(45) Date of Patent: Apr. 14, 2015

(54) AUTHENTICATION SYSTEM, AND METHOD FOR REGISTERING AND MATCHING AUTHENTICATION INFORMATION

(76) Inventor: Yoichiro Ito, Nagoya (JP)

( * ) Notice: Subject to any disclaimer, the term of this patent is extended or adjusted under 35 U.S.C. 154(b) by 349 days.

(21) Appl. No.: 13/577,798

(22) PCT Filed: Feb. 10, 2011

(86) PCT No.: PCT/JP2011/000776
§ 371 (c)(1),
(2), (4) Date: Aug. 8, 2012

(87) PCT Pub. No.: WO2011/099302
PCT Pub. Date: Aug. 18, 2011

(65) Prior Publication Data
US 2012/0300985 A1    Nov. 29, 2012

(30) Foreign Application Priority Data
Feb. 12, 2010    (JP) .................................. 2010-029528

(51) Int. Cl.
| G06K 9/00 | (2006.01) |
| G06F 21/32 | (2013.01) |
| H04L 29/06 | (2006.01) |
| H04L 9/32 | (2006.01) |
| G07C 9/00 | (2006.01) |

(52) U.S. Cl.
CPC ........ *G06F 21/32* (2013.01); *G06F 2221/2117* (2013.01); *H04L 63/0861* (2013.01); *H04L 9/3231* (2013.01); *H04L 2209/88* (2013.01); *G07C 9/00158* (2013.01); *G06K 9/00577* (2013.01)

(58) Field of Classification Search
None
See application file for complete search history.

(56) References Cited

U.S. PATENT DOCUMENTS

| 6,115,494 | A | * | 9/2000 | Sonoda et al. ................ 382/165 |
| 6,804,356 | B1 | * | 10/2004 | Krishnamachari ........... 380/201 |
| 6,952,484 | B1 | * | 10/2005 | Higginbottom et al. ...... 382/100 |
| 8,265,381 | B2 | * | 9/2012 | Ito ................................. 382/165 |
| 2008/0205766 | A1 | | 8/2008 | Ito et al. |

FOREIGN PATENT DOCUMENTS

| JP | A-5-274435 | 10/1993 |
| JP | A-5-324921 | 12/1993 |
| JP | A-2007-34380 | 2/2007 |
| JP | A-2008-15860 | 1/2008 |
| JP | A-2009-205393 | 9/2009 |

(Continued)

OTHER PUBLICATIONS

Office Action issued in Japanese Patent Application No. 2013-108295 dated Apr. 15, 2014.

(Continued)

Primary Examiner — Nancy Bitar
(74) Attorney, Agent, or Firm — Oliff PLC

(57) ABSTRACT

A certain amount of unique data of a target is extracted from image information that was read, and it is determined whether or not the target is valid on the basis of the extracted unique data. Processes are executed by means of an image reading unit which extracts an image by scanning a target, an individual difference data calculating unit which calculates individual difference data from the obtained image, an individual difference data comparing unit which compares the calculated individual difference data, and a determination unit which determines whether or not to grant validation.

9 Claims, 23 Drawing Sheets

(56) References Cited

FOREIGN PATENT DOCUMENTS

| | | |
|---|---|---|
| JP | A-2009-290878 | 12/2009 |
| WO | WO02/07096 | 1/2002 |
| WO | WO 2007/013444 A1 | 2/2007 |

OTHER PUBLICATIONS

International Search Report issued in International Patent Application No. PCT/JP2011/000776 dated Mar. 8, 2011.

* cited by examiner

EXAMPLE TINTED-GLASSES CONNECTION 1701

| ONE-STROKE LINE IMAGE TYPE | SEQUENCE TYPE |
|---|---|
| CONNECTION ORDER FOR REPRODUCTION INSTABILITY ELEMENTS | DESCENDING ORDER |
| LEAST REQUIRED CONNECTION DISTANCE | 60[μm] |
| THRESHOLD VALUE FOR REPRODUCTION INSTABILITY STRENGTH | 10.0 |
| THRESHOLD VALUE FOR CHANGE IN STRENGTH | 1.0 |
| THE NUMBER OF CONNECTION POINTS | 250 |
| SCAN AREA SIZE | 5.4[mm]x5.4[mm] |
| MATCHED POLYGON FORM | THREE-POINT FORM |
| THRESHOLD VALUE FOR THE NUMBER OF FORMS FOR MATCH DETERMINATION | 4 POLYGONS |

FIG.17

INDEX TYPE

| |
|---|
| STARTING POINT, THREE DIMENSIONAL COORDINATES $P_0(X, Y, Z)$ |
| STARTING POINT, THREE DIMENSIONAL VECTOR $V_0$ |
| DISTANCE $D_0$ |
| STARTING POINT, THREE DIMENSIONAL VECTOR $V_1$ |
| DISTANCE $D_1$ |
| STARTING POINT, THREE DIMENSIONAL VECTOR $V_2$ |
| DISTANCE $D_2$ |
| STARTING POINT, THREE DIMENSIONAL VECTOR $V_3$ |
| DISTANCE $D_3$ |
| ⋮ |

THE NUMBER OF CONNECTION POINTS − 1

FIG.18

SEQUENCE TYPE

| | |
|---|---|
| THE NUMBER OF CONNECTION POINTS | THREE DIMENSIONAL COORDINATES $P_0(X, Y, Z)$ |
| | THREE DIMENSIONAL COORDINATES $P_1(X, Y, Z)$ |
| | THREE DIMENSIONAL COORDINATES $P_2(X, Y, Z)$ |
| | THREE DIMENSIONAL COORDINATES $P_3(X, Y, Z)$ |
| | THREE DIMENSIONAL COORDINATES $P_4(X, Y, Z)$ |
| | ⋮ |

FIG.19

AUTHENTICATION SYSTEM, AND METHOD FOR REGISTERING AND MATCHING AUTHENTICATION INFORMATION

TECHNICAL FIELD

The present invention relates to an authentication system, and to a method for registering authentication information and for matching authentication information, i.e., an authentication system that extracts, from image data, characteristics inherent to a subject image, and employs the extracted characteristics, and a method for registering authentication information and for matching authentication information.

BACKGROUND ART

Various types of authentication techniques for determining whether or not a subject is an authorized target have been employed for all aspects of human behavior and activities, and since the advent of the Internet and the development of the electronic processing of information, a higher level authentication technique is required. As an orthodox authentication technique, an item having a unique shape, such as a seal or a signature, is provided as a marker for a subject, and at the present, technical features, such as a hologram, an embedded pattern (a watermark), a latent image, pearl ink, microprinting, luminescent ink and intaglio printing, are employed to prevent counterfeiting. Moreover, in accordance with the development of electronic processing, predetermined information, such as a passwords, is encrypted as secret information and employed for comparison to prevent forgeries. Furthermore, various biometric authentication techniques are also employed whereby biometric data unique to an individual human body, such as fingerprints, are registered in advance, so that in a case wherein authentication is required, actual biometric data are gathered by reading and authentication performed by determining whether the biometric data gathered for the case matches the registered biometric data (see, for example, patent literature 1).

CITATION LIST

Patent Literature

PTL 1: Japanese Patent Laid-Open No. 2009-205393

SUMMARY OF INVENTION

However, of the above described authentication techniques, a problem exists, with the technique for which a password is employed, in that since a password must be decided in advance and a user must remember the password, the amount of information involved is so extremely small that stealing or forgery of the information could be easy.

For the technique that employs biometric data, only a human being can be employed for a determination as to whether or not a subject is an authorized subject, and basically, targets or other animals or plants can not be used. However, as another problem, recently, since an action for forging biometric data has occurred, the authentication technique for which biometric data is employed is not always completely safe.

Furthermore, since most high-level authentication techniques require the advance physical or electronic attachment of authentication information to a subject, processing performed for the subject is required, so that promotion of the use of the authentication technique is hindered.

While taking the above described conventional problems into account, one targetive of the present invention is to provide an authentication system that does not require processing for a target to be authenticated and that extracts unique data from image data representing individual characteristics of the target, which are obtained under predetermined configuration requirements, by employing a standard digital imaging apparatus having a predetermined configuration and then employing the extracted unique data to determine whether the target is an authorized target, as well as a method for registering authentication information and for matching authentication information.

To achieve this targetive, the invention according to claim 1 is characterized by comprising:

storage means for storing, as individual difference data used to uniquely identify a target to be authenticated, connected lines that are generated in such a manner that a plurality of sets of digital data are obtained by scanning and resolving the target using digital imaging means, an optical data difference is calculated at corresponding positions, designated by the digital data, midpoints for physical positions of a subject, which correspond to center positions of pixels located at the obtained corresponding positions, are calculated based on a physical size of the subject that corresponds to a pixel size of the digital imaging means, and are coupled in order, as connection points, beginning with the largest optical data difference;

transformation value calculation means for, when the digital imaging means has obtained digital data through scanning, multiple times, the target to be authenticated under configuration requirements for the digital imaging means, comparing a plurality of sets of the thus obtained digital data, and calculating translation and rotational transformation of the individual digital data sets in order to match positions for mapping the target to be authenticated; and individual difference data extraction and determination means for employing the obtained translation and rotational transformation to identify correlated positions of pixel arrays of the plurality of digital data sets and to read, from the storage means, the connected lines for the individual difference data for the corresponding positions, for tracing a polygonal line to search for locations of the connection points present on the connected lines that have been read, and for calculating an optical data difference of pixels on physical pixel planes that include the locations of the connection points, and that are superimposed, and when it is determined that a predetermined relationship is established between the obtained optical data difference and the order of the connected lines, determining that authentication is successful.

For the invention according to claim 2, the authentication system of claim 1 is characterized in that:

a resolution of the digital imaging means is included in configuration requirements for the digital imaging means; and the resolution of the digital imaging means is lower than a particle size used to form an image of the target to be authenticated.

For the invention according to claim 3, the authentication system of claim 1 or 2 is characterized in that the transformation value calculation means sequentially scans the target to be authenticated a plurality of times.

For the invention according to claim 4, the authentication system of one of claims 1 to 3 is characterized by further comprising:

correction means for employing predesignated information to perform correction for normalizing a difference in image data caused by a difference in configuration requirements for the digital imaging means.

The invention according to claim 5, the authentication system of one of claims 1 to 4 is characterized in that:

the storage means also stores a line connection comparison setup, including parameters and comparison methods, to be used for comparison of connected lines; and the individual difference data extraction and determination means employs the comparison setup stored in the storage means to trace, along a polygonal line, positions of connection points on the connected lines that have been read, and determines that authentication is successful, when the obtained optical data difference indicates, with respect to the order of connection lines, a predetermined relationship that is designated in the comparison setup.

For the invention according to claim 6, the authentication system of one of claims 1 to 5 is characterized in that when the obtained optical data difference indicates a descending order by a predetermined number, with respect to the order of the connection lines, the individual difference data extraction and determination means determines that authentication is successful.

The invention according to claim 7 is an authentication information registration method, characterized by comprising:

a transformation value calculation step of calculating parallel translation and rotational transformation, so that based on predetermined configuration requirements for digital imaging means, a target to be authenticated is scanned by the digital imaging means a plurality of times to obtain digital data, a plurality of sets of digital data thus obtained are compared with each other, and locations at which mapping for the target to be authenticated is performed using the digital data are matched;

a step of employing the obtained parallel translation and rotational transformation to designate correlated locations of pixel arrays of the plurality of sets of digital data, and calculating an optical data difference for the correlated locations that are designated;

a step of calculating a physical size for a subject, with respect to a pixel size of digital data based on configuration requirements for the digital imaging means, employing the obtained physical size to calculate, as connection points, midpoints of physical positions of the subject that correspond to the center positions of pixels that are located at the corresponding positions, coupling the connection points in the descending order, by an arbitrary number of times, beginning with the largest optical data difference, and extracting connected lines as individual difference data; and a registration step of registering the extracted connected lines at storage means.

For an authentication system that includes storage means for storing, as individual difference data used to uniquely identify a target to be authenticated, connected lines that are generated in such a manner that a plurality of sets of digital data are obtained by scanning and resolving the target using digital imaging means, an optical data difference is calculated at corresponding positions, designated by the digital data, midpoints for physical positions of a subject, which correspond to center positions of pixels located at the obtained corresponding positions, are calculated based on a physical size of the subject that corresponds to a pixel size of the digital imaging means, and are coupled in order, as connection points, beginning with the largest optical data difference, the invention according to claim 8 is characterized by comprising:

a transformation value calculation step of, when the digital imaging means has obtained digital data through scanning, multiple times, the target to be authenticated under configuration requirements for the digital imaging means, comparing a plurality of sets of the thus obtained digital data, and calculating translation and rotational transformation of the individual digital data sets in order to match positions for mapping the target to be authenticated; and an individual difference data extraction and determination step of employing the obtained translation and rotational transformation to identify correlated positions of pixel arrays of the plurality of digital data sets and to read, from the storage means, the connected lines for the individual difference data for the corresponding positions, tracing a polygonal line to search for locations of the connection points present on the connected lines that have been read, and for calculating an optical data difference of pixels on physical pixel planes that include the locations of the connection points, and that are superimposed, and when it is determined that a predetermined relationship is established between the obtained optical data difference and the order of the connected lines, determining that authentication is successful.

BRIEF DESCRIPTION OF DRAWINGS

FIG. 17 is a diagram showing an example tinted-glasses connection for the embodiment of the present invention;

FIG. 18 is a diagram showing an example connection method for a one-stroke line image according to the embodiment of the present invention;

FIG. 19 is a diagram showing another example connection method for a one-stroke line image according to the embodiment of the present invention;

DESCRIPTION OF EMBODIMENTS

Figure 1:
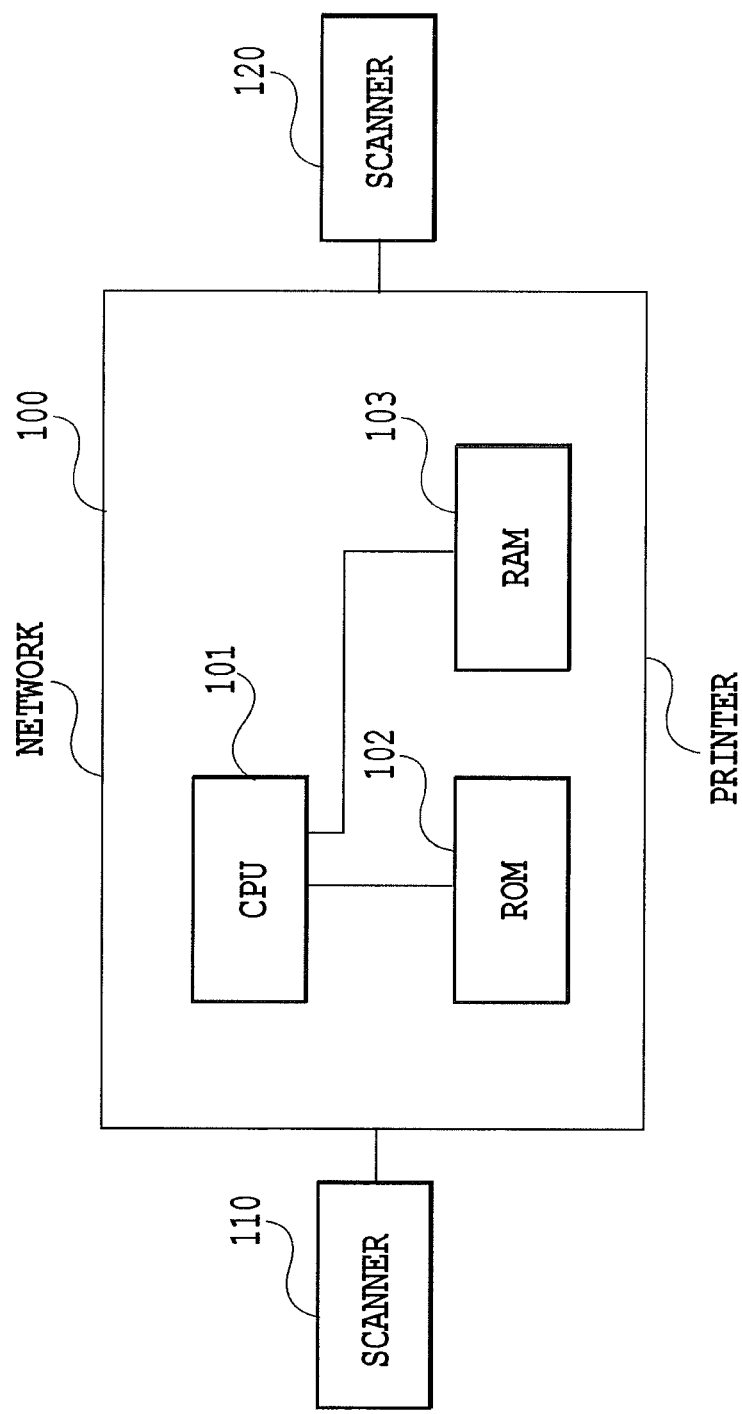
FIG. 1 is a system configuration diagram for an authentication system according to one embodiment of the present invention.

One embodiment for an authentication system, a method for registering authentication information, and for matching authentication information of the present invention will now be described, while referring to drawings.

<Principle of Individual Authentication System>

The system of this embodiment determines the identity of a target to be authenticated, based on principles related to unique information for the target extracted from image data, which represents the characteristics of each target obtained, under predetermined configuration requirements by a standard digital imaging apparatus having a predetermined configuration, without any processing being required for the target, and based on a unique information extraction method, for extracting unique information from an image that was read, and an individual authentication method, for authenticating a target, as needed, based on the unique information that is extracted. Further, targets can include arbitrary materials, such as printed matter and various finished products or parts, and human bodies, so long as an image can be obtained by scanning or imaging the surface.

<Unique Information Based on Individual Difference>

The purpose for scanning a material that actually exists using a digital imaging apparatus, such as a scanner or a camera, is to quantize the status of the surface; however, the entire structure of the material to be processed can not be read. It can be said that scanning of the surface of the material is mapping of a phenomenon that occurs, moment by moment, on the surface of the material. For example, when image scanning is performed by an image sensor (CCD/CMOS), wherein light-receiving portions, such as imaging elements, which react to light of an optical wavelength (a visible light range of a short wavelength of 360 nm to 400 nm to a long wavelength of 760 nm to 830 nm) are arranged on the plane, a difference occurs in the image processing, the primary color spectroscopy and the element configuration, but reproduction for digital mapping of phenomenon is performed by a color imaging process (numerical imaging process) during which collected light is separated into RGB and others, charge reactions of the individual light-receiving portions are quantized to numerical values, and the numerical values are arranged in order and output as array data. The optical mapping data obtained is a numerical value replaced with the scale of a resolution that corresponds to the XYZ arrangement. Further, for the image sensor, when a pixel resolution is high, i.e., when the sizes of the individual light-receiving portions of the sensor are smaller than the wavelength of light, optical observation is disabled, or when the light-receiving portions are greater, observation of the material by the individual light-receiving portions is also disabled. Furthermore, since a natural substance is arranged at random, reconstruction of the natural substance is also impossible by using the image sensor, where the light-receiving portions are provided as arrays.

This indicates resolving power, and image data is formed in such a manner that, when reactions have occurred relative to light received in consonance with the sizes of elements, which are scan unit areas for the image sensor, the reactions are quantized to be provided as an array, i.e., when the amount of electricity is generated in consonance with light received at the individual elements arranged in a predetermined form in the image sensor, the amount of electricity is provided as an array. Therefore, this quantization process is also eventually a color compression process for performing quantization for a phenomenon that occurs in one part of a target that corresponds to one scan unit area, and it can be said that image data obtained by arranging the results is a phenomenon resolved in accordance with the size of the scan unit area. That is, image data obtained by scanning is changed in accordance with configuration requirements, such as a resolution, and in this embodiment, this phenomenon is focused on to extract unique information for a target. Here, the configuration requirements are the structural and exposure requirements for an imaging apparatus, consisting of parameters that represent the physical locations, the types, the sizes, the resolutions, the lens arrangements and the lens magnifications of imaging elements, and the physical location, the luminescence, the frequency properties, the color temperature of a lighting device, such as an LED, a subject distance relative to a target to be authenticated, a focal position, a focal length, a shutter speed, a frame rate, and a positional relationship between the target to be authenticated and an optical system that includes the lenses and the imaging elements.

Figure 4:
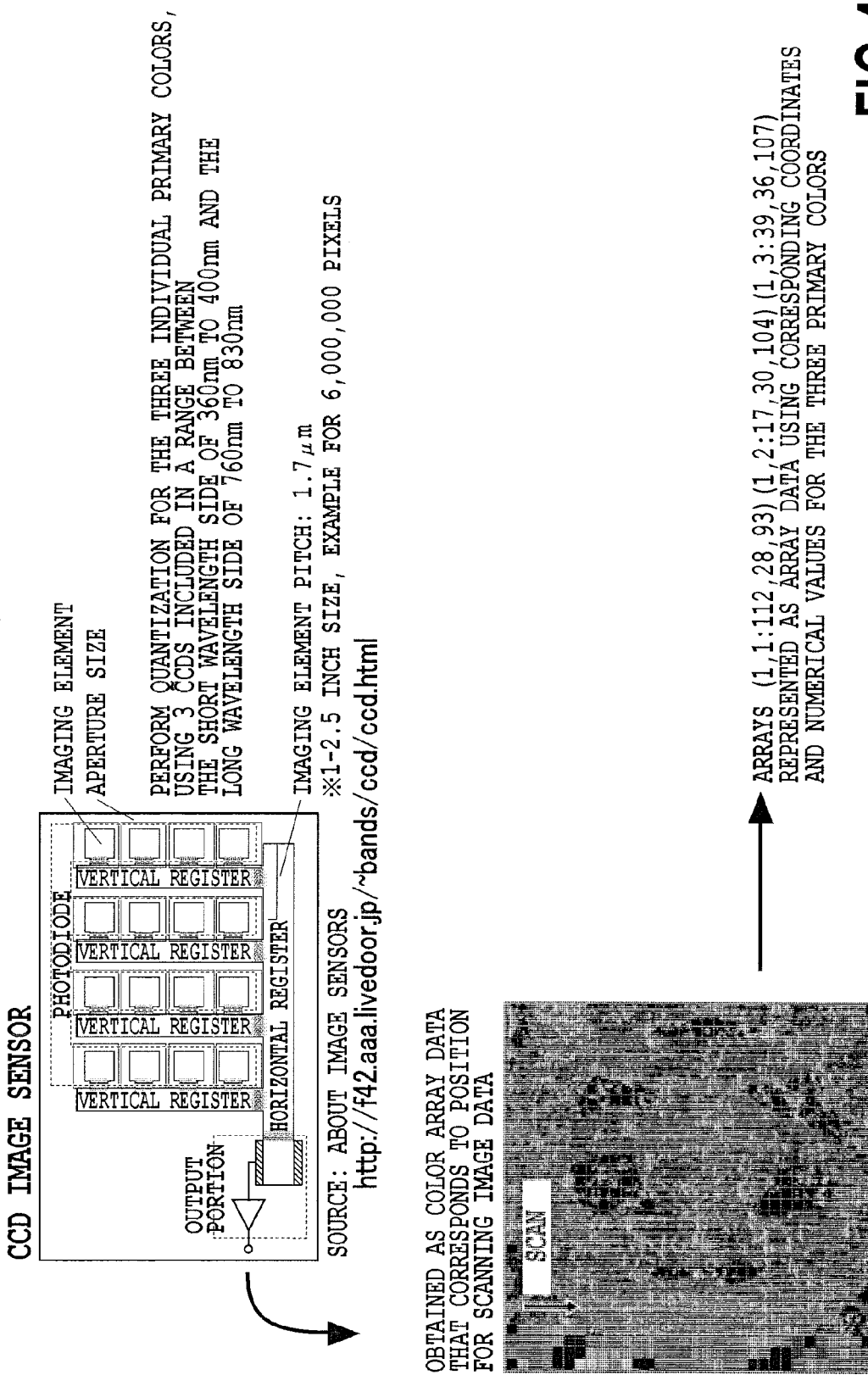
FIG. 4 is a diagram for explaining the principle of the present invention.

Since a target for which authentication is actually to be determined is formed of a natural material, the smallest size of this material is a "particle", which is even smaller than nano- and micro-sized. Photons are larger than these particles, and for visible light, since the wavelength is set in the visible light range between a short wavelength of 360 nm to 400 nm to a long wavelength of 760 nm to 830 nm, light (visible light) is not reflected at the unit area of a substance that is smaller than the above described size. Therefore, the phenomenon of a natural substance that is much smaller than the scale of a resolution can not be interpreted by quantization using a sensor; however, the reading results, i.e., the values output by the sensor are affected by the phenomenon that occurs in the unit area of that size. That is, when the scanning position is shifted even slightly (by micro-order), i.e., when the positions of the arrays of image data obtained by reading the same target a plurality of times are slightly shifted away from the corresponding locations of the elements of the image sensor employed for reading, the corresponding numerical values of optical data to be obtained by the elements are adversely affected, and thus, even when scanning of the same target is repeated under the same condition, the same scan data can not be obtained. This phenomenon always occurs so long as an image sensor that has a resolution smaller than the wavelength of light is not provided, and in this invention, a difference in the reading results is called a resolution difference. FIG. 4 is a diagram for explaining this difference resolution by employing a specific CCD sensor. It should be noted that an example shown in FIG. 4 is merely an example for which this principle is applied, and the present invention is not limited to any of the techniques specifically described in this example.

Referring to FIG. 4, generally, in a CCD sensor, for example, that is employed for a scanner that reads a target to be authenticated, light is split into RGB light, etc., by imaging elements arranged at predetermined intervals, as illustrated, and the visible light having a wavelength (in a visible light range of a short wavelength of 360 nm to 400 nm to a long wavelength of 760 nm to 830 nm) enters the apertures of the imaging elements and are converted into electrical charges, which are then accumulated. The RGB visible light is digitized by employing the accumulated electrical charges as the intensity of light, and based on the numerical digital values for RGB, etc., color compression is performed for incident light that is limited by the pitches and the apertures of the imaging elements, so that one color is allocated for one element, and the target to be authenticated is expressed as a color data array. The thus obtained color data array is expressed as numerical data that represent the coordinates for the locations of the imaging elements and the individual components, such as RGB, of the trichromatic system. For example, assuming that the color data array is (X coordinate, Y coordinate: R, G, B), data like (1, 1: 112, 28, 93), (1,2: 17, 30, 104), (1, 3: 39, 36, 107), . . . , are obtained, as illustrated, and these values differ from each other because each time the scanner reads the target, the scanning position is varied by micro order.

The resolution difference also occurs for printed matter produced in a nano-size or micro-size. When images are obtained by scanning duplicate copies (mass-produced goods) like printed matter, there is an influence, exerted by a printing error and a difference in paper surfaces, at a nano-level or a micro-level, which can not be really observed for the actual phenomenon. That is, the characteristics of an individual based on nano-sized particles, which are provided without the intention, or which are not available for mass production even with the intention, are incorporated into the resolution difference. A difference that is generated, due to a difference between resolutions during scanning of the target, and due to the characteristics of an individual, is called an "individual difference" in this invention.

<Extraction of Information Unique to Target>

According to this invention, a difference in individuals is obtained from targets, such as printed material, although not limited to them and unique information for one target is extracted, based on the obtained individual difference, and is employed for the authentication processing. One such method for extracting information inherent to a target will now be explained. As described above, when image data are output each time scanning is employed, reproduction of the resolved images becomes unstable, and a difference in individuals is incorporated into the image data. However, since the values obtained simply by resolving are generally not constant, these values can not be employed as information that uniquely represents the target. Therefore, information for obtaining a predetermined relation is extracted from the individual difference. That is, the data obtained by scanning are compared, based on the corresponding positions for these data, and are rearranged in order, beginning with the data where the greatest change is made, and the positional relationship of the data is replaced by the three-dimensional coordinates, the points of which are connected in order, so that a specific polygonal line pattern, i.e., a "line" is generated, along which "reconstruction instability element points", which are elements used to prevent the same image resolving due to an individual difference, are arranged in the order of strength of reconstruction instability. As previously described, regardless of the resolution of the sensor of the scanner, this "line" can always be generated by scanning the image of a target, and the order for drawing the "line" includes predetermined universality based on the uniqueness of the information that is inherent to the target.

Since the order for drawing the line is the order in which reproduction instability occurs, specifically, this order can be obtained in such a manner that the same target is scanned at least twice, and the ranking that represents differences in the scanning results is specified. According to the fundamental principle of the present invention, while there is a problem that, each time a target is scanned, the same results are not always obtained, depending on physical conditions (the wavelength and property of light), and for mass-produced goods, such as printed material, only an identification of the type is enabled by a comparison of the obtained individual difference and identification of an individual is difficult, this problem can be resolved by using a more specific method, whereby, instead of performing a comparison of individual differences, the ranking for instability for image reproduction is observed for each array that is scanned, in order to enable identification of an individual. This can be realized based on the fact that a target physically exists and the fact that the arrays of the image sensor are physically present. That is, the arrangement of the image sensor is physically constant, and since the probability that the internal structure of the image sensor will be adversely affected when a scanning position is shifted for each scanning is at least lower than the probability that shifting will occur in the scanning position, it can be assumed that the arrays of the image sensor be maintained in the original configuration state. Therefore, in the "line" pattern obtained from image data (array values) in the scanned area, the positional relationship is maintained. That is, for the individual elements of the image sensor, the values are changed for each scanning, but the order of differences is maintained. Further, when different printed matter, for example, is employed as a target and is scanned along the above described "line" pattern, a probability of matching is low, and a probability, which will be described later, is obtained based on the number of "reproduction instability element points", so that determination of authentication can be appropriately performed. Since the "line pattern" represents image resolving instability, i.e., expresses the degree of instability as to the values that are obtained for image data by the corresponding elements, the line pattern also indicates the order at which reproduction instability occurs. In this case, since it is simply required that the "line pattern" express the degree of instability for reproduction, the line pattern can be obtained by scanning the same target sequentially at least twice, and employing the ranking for differences of the scanning results. That is, image data obtained by sequentially scanning twice, for example, differ slightly from each other, because of the characteristics of the target that are smaller (finer) than the resolution level employed for scanning, and when these differences are processed based on the concept, such as the ranking, the detailed characteristics of the target can be obtained. In this case, scanning is generally sequentially repeated twice, i.e., performed within a predetermined period of time, because when a time interval is too long, a phenomenon that has occurred in the target is greatly changed, and the above described principle might not become effective. For example, in a case wherein the power of the imaging apparatus is turned off after the first photographing was performed, the imaging conditions are greatly changed due to non-reversibility for the amount of electric charges in the image sensor and the sensitivity to the amount of light, and there is a probability that adjustment for the conditions will be difficult. Therefore, it is preferable that photographing multiple times be performed within a predetermined contiguous period, or be continuously performed in the state wherein almost the same photographing conditions are maintained. According to the principle of the present invention described above, no new apparatus is required, while a phenomenon that can not be captured in a single image resolving process is estimated by employing a plurality of sets of image data, and a phenomenon of a target beyond the resolving power of the image sensor can be obtained.

Figure 5:
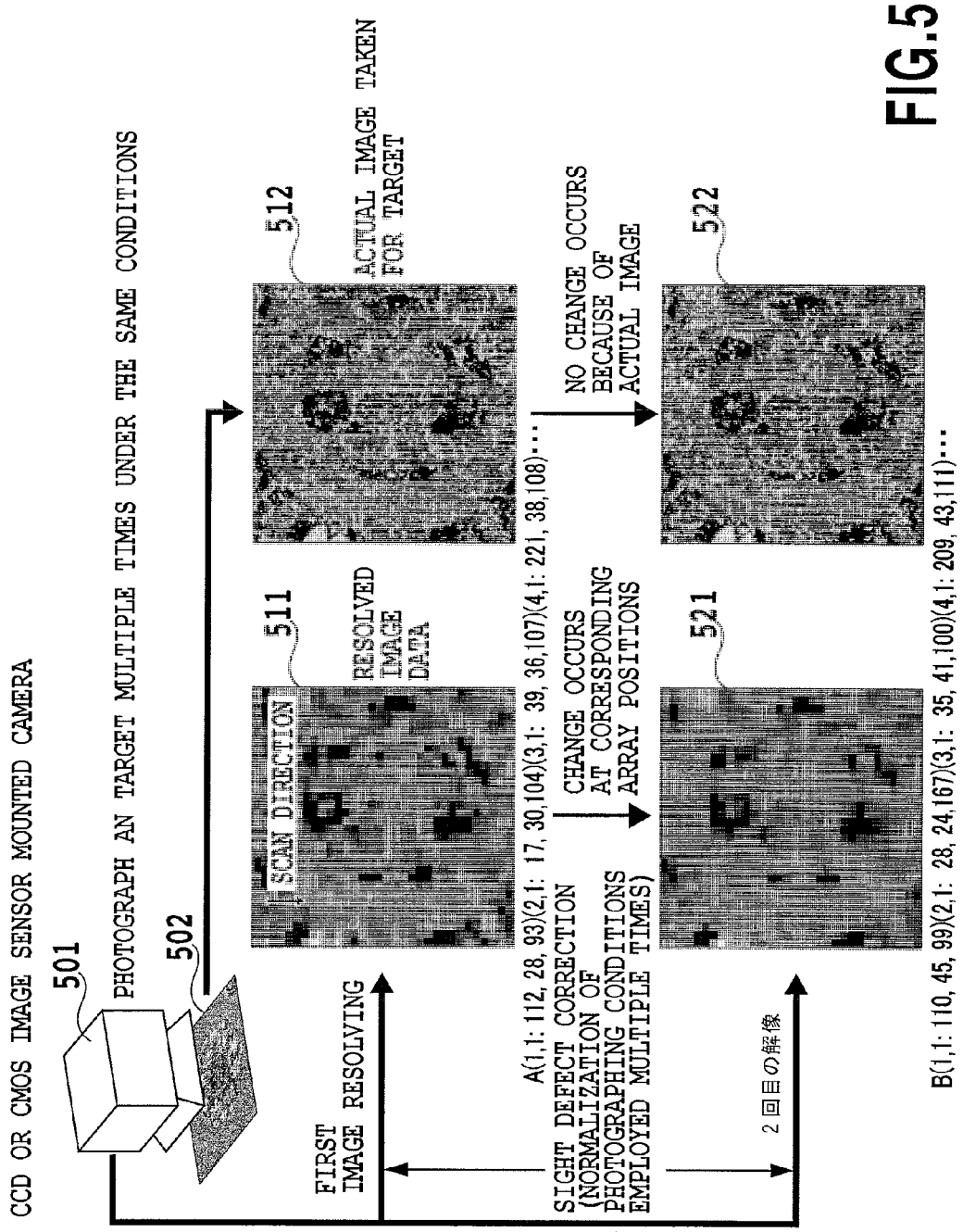
FIG. 5 is a diagram for explaining the processing, of the embodiment of the present invention, for extracting an individual identification pattern.
Figure 20:
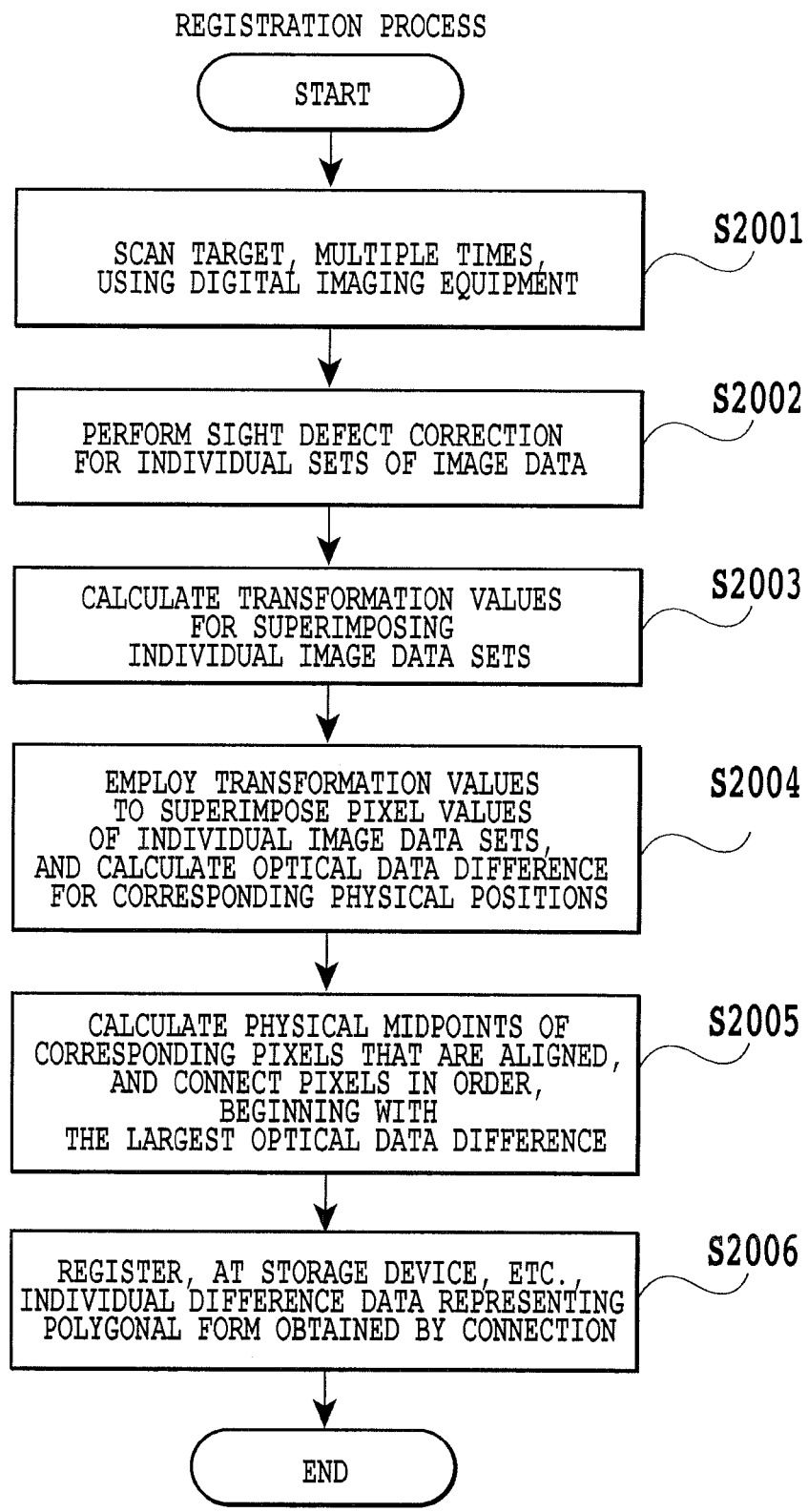
FIG. 20 is a flowchart showing the processing for registering individual difference data according to this embodiment.

One process for extracting information inherent to a target will now be described by employing the above described principle. Referring to FIG. 5, as explained while referring to FIG. 4, a camera 501 where a CCD or CMOS image sensor is mounted sequentially scans a target 502 multiple times under the same configuration requirements, and obtains digital data. FIG. 20 is a flowchart showing the processing for registering individual difference data according to this embodiment.

Since a different imaging apparatus might also be employed for authentication, standard instruction data are employed to obtain, in advance, correction values for normalizing the image resolving process, i.e., for performing a sight defect correction, such as a correction of the location of an imaging apparatus, etc., employed to calculate individual difference data, corrections of a resolution and the light-receiving color temperature for a sensor, white balance correction, ISO speed correction, lens distortion correction, correction of chromatic aberration, concentration correction, correction of the amount of light for illumination, spectrum correction and conversion that is consonant with the type of an imaging apparatus. A filter provided for using these correction values is employed for the obtained image data. With this arrangement, the individual pixel values of image data can be changed, and regardless of the configuration of the imaging apparatus, the reading of image data is enabled under a predetermined condition; however, the method is not limited to this, and the exchange of data representing correction values may also be performed while the data are stored in a storage device, or another method well known for this technical field may be employed to generate image data. For example, in a case wherein different imaging apparatuses are employed for registration and for authentication, the resolution may be stored in advance, and when low-resolution image data is to be processed, the resolution of the low-resolution image data may be changed to the same level by being increased (the amount of data becomes greater as the resolution is increased, while the numerical value is unchanged), or decreased.

The same images 512 and 522 are actually captured for the target by the first scan and second scan; however, when image data 511 obtained the first time and the image data 521 obtained the second time are compared, it is understood that different array data are obtained due to a slight difference in the scanning positions of a scanner. Specifically, compared with the array of the image data 511 obtained during the first scan, (1,1: 112, 28, 93) (2,1: 17, 30, 104) (3,1: 39, 36, 107) (4,1: 221, 38, 108), . . . , the array of the image data obtained by the second scan slightly differs, which is (1,1: 110, 45, 99) (2,1: 28, 24, 167) (3,1: 35, 41, 100) (4,1: 209, 43, 111), . . . .

Figure 6:
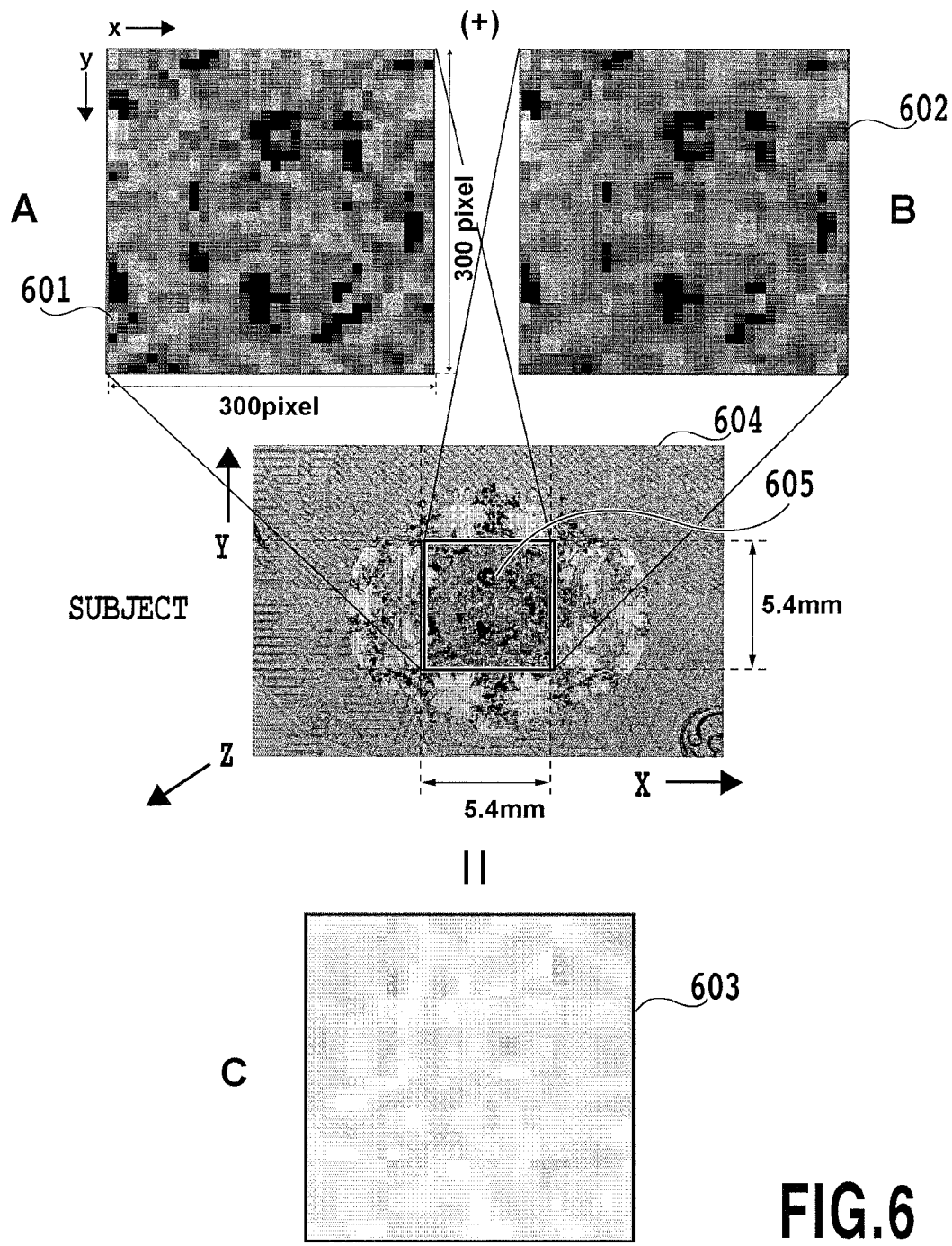
FIG. 6 is a diagram for explaining the processing, of the embodiment of the present invention, for extracting an individual identification pattern.

Then, a resolution difference is extracted from a plurality of image data sets obtained by scanning the target multiple times in the above described manner. Specifically, as shown in FIG. 6, a plurality of sets, two sets in this case, i.e., image data 601 and 602 are employed to extract a differential image 603, and a resolution difference that occurs when image resolving is performed multiple times is regarded as an optical data difference, and is employed to reveal an individual difference. In a case wherein a resolution difference is to be calculated, comparison of different points is meaningless, and transformation values for translation and rotation for the individual sets of image data are calculated to align the positions where the same portion of the subject is to be mapped. The transformation values obtained for the image data are employed to superimpose the pixel arrays of the individual sets of image data, and optical data of pixels at the aligned positions are compared to calculate an optical data difference. Any well known method for this technical field can be employed for the calculation of the transformation values for aligning the positions.

For calculation of these transformation values, for example, several characteristic points may be extracted from the individual sets of image data, and affine transformation, for example, may be performed to match these characteristic points; however, the calculation method is not limited to this. In this embodiment, for a comparison of a plurality of sets of image data, points correlated with each other are designated, and transformation values are calculated, which indicate how translations, such as parallel shifts, or rotations should be performed for image data in order to superimpose the points; however, instead of actually changing image data to overlay, the transformation values are employed to specify corresponding points, and a difference of optical data is obtained for pixels located at the corresponding points. This is because there is a probability that, when image data are superimposed by actually performing transformation, a slight shift occurs. Therefore, so long as such a shift can be avoided, it may actually be possible for the transformation process to be performed for the image data, following which a difference is calculated and the above processing is performed.

Figure 22:
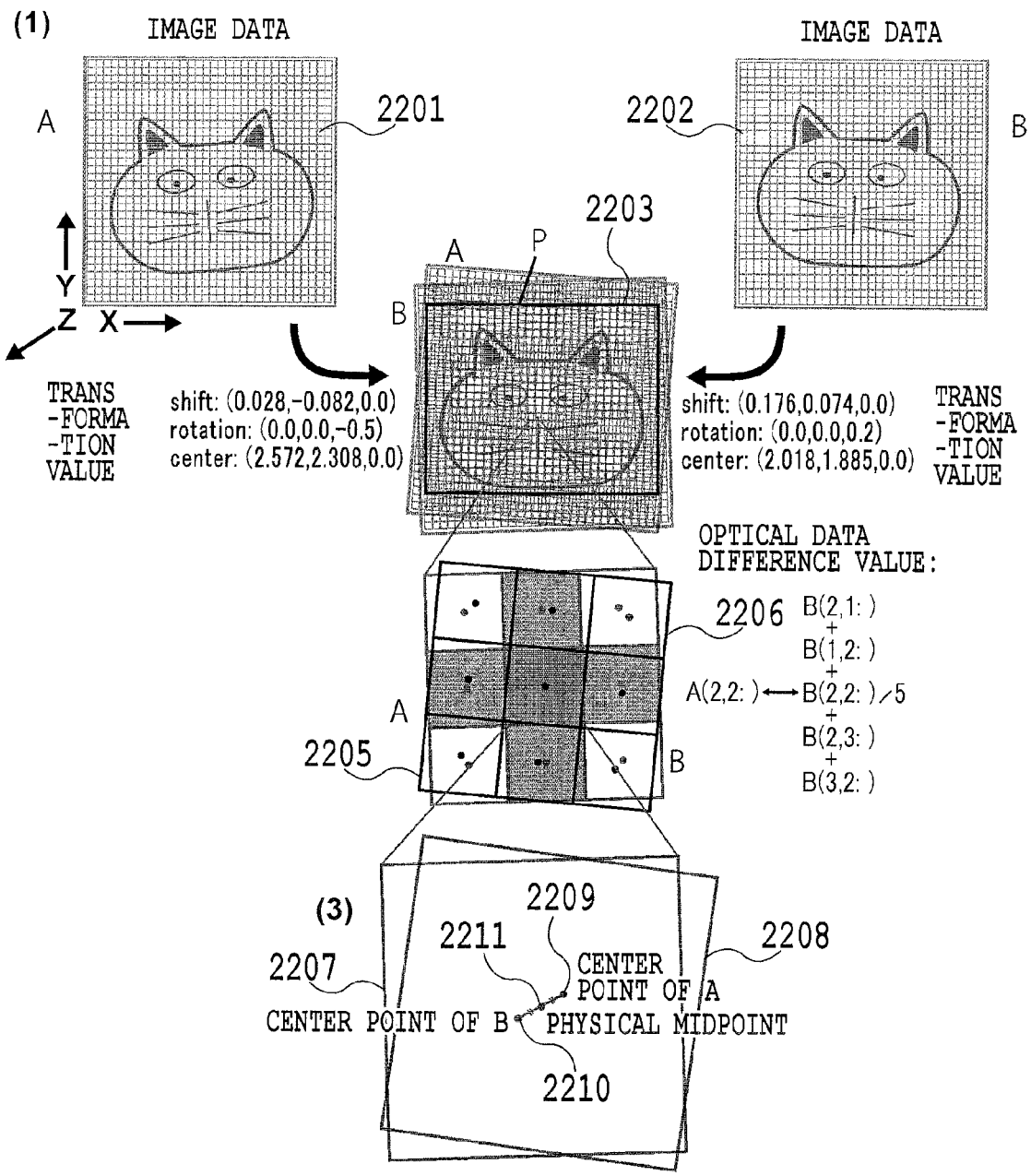
FIG. 22 is a detailed diagram for explaining calculation of an optical data difference according to this embodiment.

FIG. 22 is a diagram for explaining a detailed example for this embodiment for calculating an optical data difference. As described above, according to this embodiment, transformation is performed for image data that are obtained by scanning a target multiple times, so that the positions of image data where mapping of a subject is performed are aligned, and the optical data for the individual pixels that are correlated with each other are compared to obtain an optical data difference. Specifically, this operation can be performed through the processing shown in FIG. 22. First, transformation values for image data A2201 and image data B2202 are calculated so as to align the positions for mapping a subject. Then, the image data A and B are transformed, the obtained optical data for corresponding pixels (RBG components in this example) are compared, and a difference of the optical data is employed as an optical data difference for the corresponding physical positions. More specifically, virtual image data P2203 shown in FIG. 22 is prepared (thus, the size of the image data P is smaller than that of the image data A or B), and the individual points of the image data A and B are obtained based on the corresponding points of image data P2203. As shown in enlarged image data portions A2205 and B2206, the pixels of the image data A and B do not completely match when the data are superimposed, and a specific pixel in the image data A2205 overlaps a plurality of pixels in the image data B2206.

Therefore, in this embodiment, for example, for acquisition of an optical data difference, a difference is calculated between an optical data value for one pixel and optical data values of a plurality of pixels that overlap that pixel; however, the method is not limited to this, and any other well known method in this technical field can be employed for calculation. In this case, a connection point that will be described later can be a midpoint 2211 of a center point 2209 of one pixel and a center 2210 of center points of corresponding multiple pixels. As a result of calculation, the image of the obtained optical data difference is expressed using color. It should be noted that, in actuality, the above described intermediate process is not present, and a one-stroke line pattern is directly obtained based on data for the optical data difference. When the individual component values are added together, the obtained total value is regarded as an optical data difference with respect to the image data A and B.

In this manner, the resolution difference can be represented as a phase difference at the position where corresponding images are superimposed, by employing, for example, the sum of the absolute values of the differences for the individual RGB components at each image superimposition position, as shown in FIG. 6. Here, since as described above the superimposition positions of pixels of the image data 601 and 602 should be identified in order to obtain a difference between the image data 601 and 602, the individual characteristic points of the individual image data sets are employed to specify in advance the corresponding positions to superimpose, so that optical data for the same portion of a subject can be compared with each other. As a result of such superimposition, the individual pixel values that correspond to the physical positions of the image data A 601 and B 602 are compared for each of the RGB components, and the obtained difference is expressed using color as an optical data difference C. That is, for the image data 601, when array A (1,1: 112, 28, 93) (2,1: 17, 30, 104) (3,1: 39, 36, 107) (4,1: 221, 38, 108) . . . and array B (1,1: 110, 45, 99) (2,1: 28, 24, 167) (3,1: 35, 41, 100) (4,1: 209, 43, 111) . . . are converted into actual distances, A' (0.009, 5.391, 0.0: 112, 28, 93) (0.027, 5.391, 0.0: 17, 30, 104) (0.045, 5.391, 0.0: 39, 36, 107) (0.063, 5.391, 0.0: 221, 38, 108) . . . (coordinate unit of μμm) and B' (0.011, 5.392, 0.0: 110, 45, 99) (0.031, 5,392, 0.0: 28, 24, 167) (0.048, 5.392, 0.0: 35, 41, 100) (0.066, 5.392, 0.0: 209, 43, 111) . . . , A' (+)B'=CB' (0.011, 5,392, 0.0: 110, 45, 99) (0.031, 5.392, 0.0: 28, 24, 167) (0.048, 5.392, 0.0: 35, 41, 100) (0.066, 5.392, 0.0: 209, 43, 111).

The resolution difference thus obtained includes an attribute unique to a target because characteristics inherent to the target are incorporated, and a predetermined correlation exists for the results that are extracted by scanning the same target multiple times. In order to make this relationship more apparent, i.e., to enable authentication of the target, the obtained resolution difference is employed to connect the reproduction instability element points. That is, based on the resolution difference, the reproduction instability element points are arranged in the descending order of the reproduction instability strength, i.e., the midpoints of the individual superimposition positions in the above described example are arranged in order beginning with the greatest value of an optical data difference, and this order represents reproducibility with respect to the image resolving process of a target to be photographed, i.e., a predetermined correlation is established about the same target. Compared with an individual difference, the numerical value of the reproduction instability strength, i.e., the optical data difference for the individual sets of image data, is more adversely affected by an error that occurs during the image resolving process, and therefore, is not appropriate as information unique to a target. Therefore, the points are rearranged and connected in order, while the numerical value of the reproduction instability strength is disregarded and only the positional information is taken into account. For positional information, the size of imaging elements, which are constituents of an imaging apparatus, and configuration information of an optical system, such as the lens structure and a subject distance, are employed, and the physical size of a subject that corresponds to the pixel size of image data is calculated based on the positions of pixels that are superimposed, and then, the midpoint of the physical mapping positions for the center points of pixels that are superimposed is obtained, so that the positional information is employed to support a case, for example, wherein the ratio of the size of image data to the size of a subject is changed when the configuration of an imaging apparatus differs for registration and for authentication.

Figure 7:
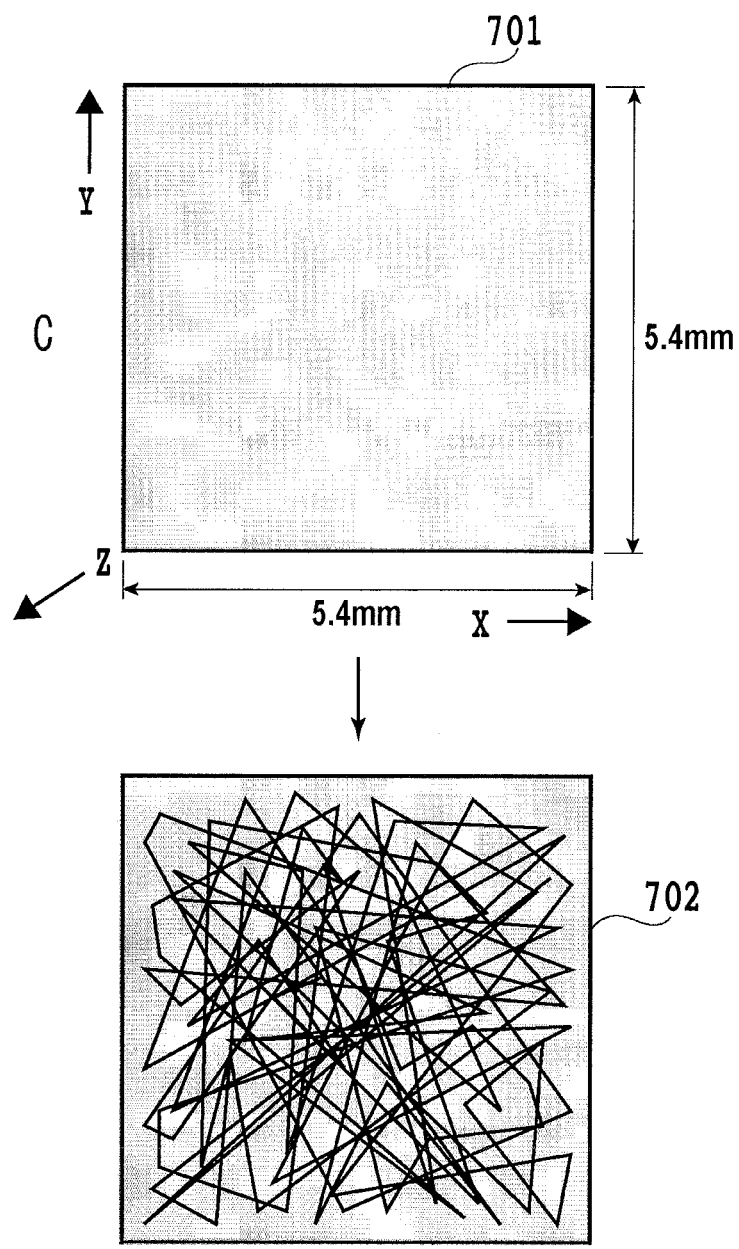
FIG. 7 is a diagram for explaining the processing, of the embodiment of the present invention, for extracting an individual identification pattern.

Specifically, as shown in FIG. 7, the transformation values of the individual image data sets, which have been superimposed to obtain the optical data difference in FIG. 6, are employed to change the superimposed pixel positions to the physical positions (three-dimensional positions) of a subject, which is mapped at the pixel center point, and the midpoints of these physical positions are employed as positional information of the individual connection points along connected lines in a polygonal line pattern that represents an individual difference. Optical data differences 701D (25) (80) (16) (20) . . . are rearranged in the order of the values of optical data differences, and A' (3.353, 0.072, 0.0) (1.771, 0.960, 0.0) (5.295, 5.245, 0.0) (4.276, 0.928, 0.0) . . . and B'(3.357, 0.072, 0.0) (1.773, 0.963, 0.0) (5.292, 5.247, 0.0) (4.275, 0.927, 0.0) . . . are obtained, which are physical positions of a subject that is mapped at the center positions of corresponding pixels for the first two image data sets that are employed for calculation of difference values. When positional information of the midpoint (the averaged position for the X, Y and Z axes) is L(3.355, 0.072, 0.0) (1.772, 0.9615, 0.0) (5.2935, 5.246, 0.0) (4.2755, 0.9275, 0.0) . . . , connected lines as shown in an image 702 are generated, which represent an individual difference obtained from the image data in the scan area. Here, connected lines or an image representing these connected lines is called a one-stroke line image. As will be described later, the obtained one-stroke line image provides the order for reproducibility, which can not be obtained by a single image resolving process, and represents characteristics unique to a target.

Through the above processing, it is possible to obtain data relative to connection of reproduction instability element points, which is individual difference data extracted based on a difference between individuals included in data obtained by scanning a target, and in this embodiment, the individual difference data is employed to perform authentication of the identify of a target. However, the individual difference data and the extraction method described above are merely representative examples for the present invention, and so long as information is inherent to a target and is incorporated to a resolution difference in image data obtained by scanning a target, such information can be extracted by using an arbitrary method well known in this technical field, and can be employed as individual difference data for this invention. Furthermore, in the above described description, the RGB component values are employed; however, as is apparent from the principle of the present invention, any data can be employed so long as the data is obtained by optically scanning the state of the surface of a target at a predetermined resolution, and consists of arrays representing the intensity of light for each scan unit area.

<Target Authentication Process>

Figure 10:
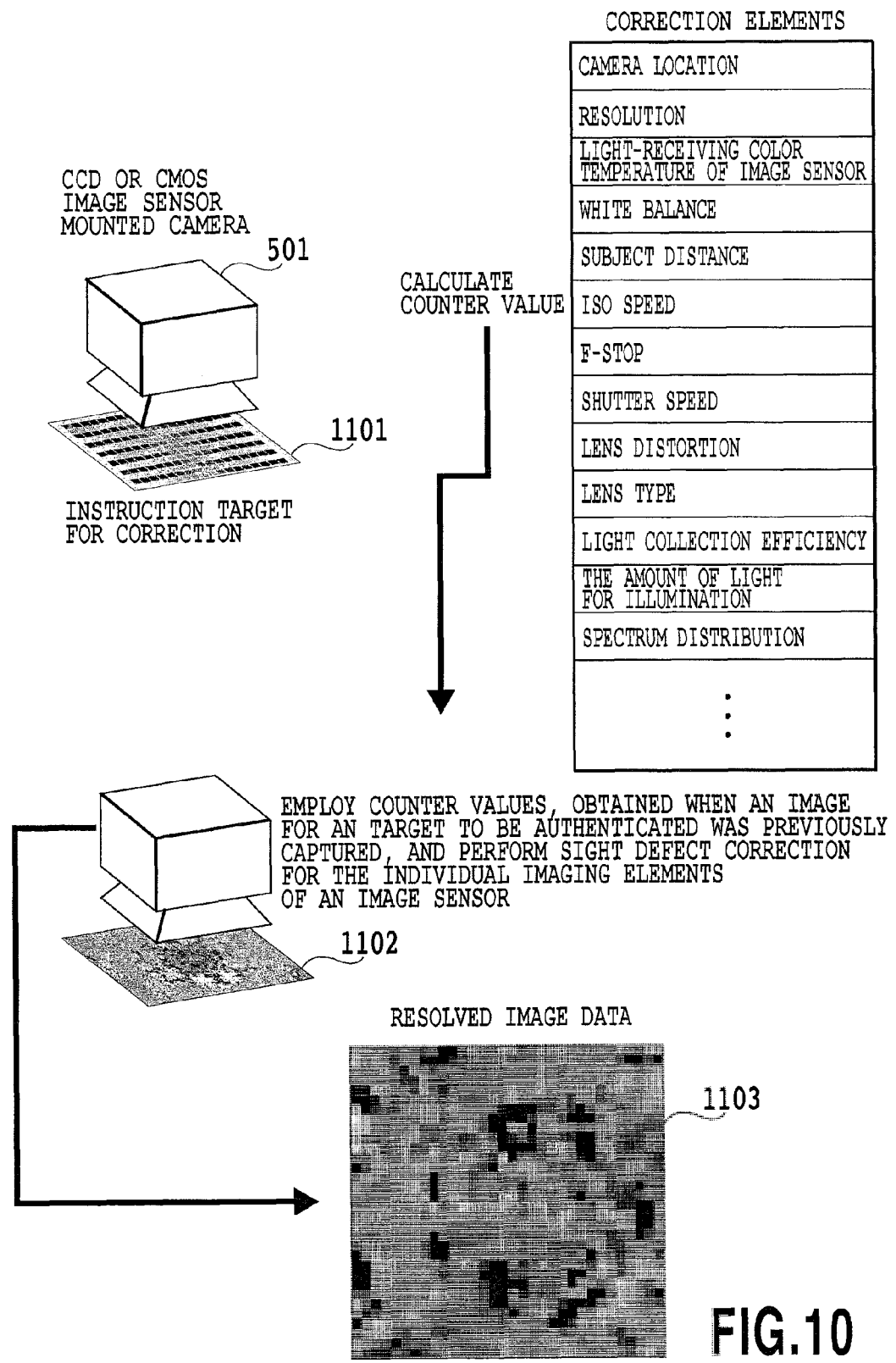
FIG. 10 is a diagram for explaining an example process, of the embodiment of the present invention, for correcting a target image that is extracted.
Figure 21:
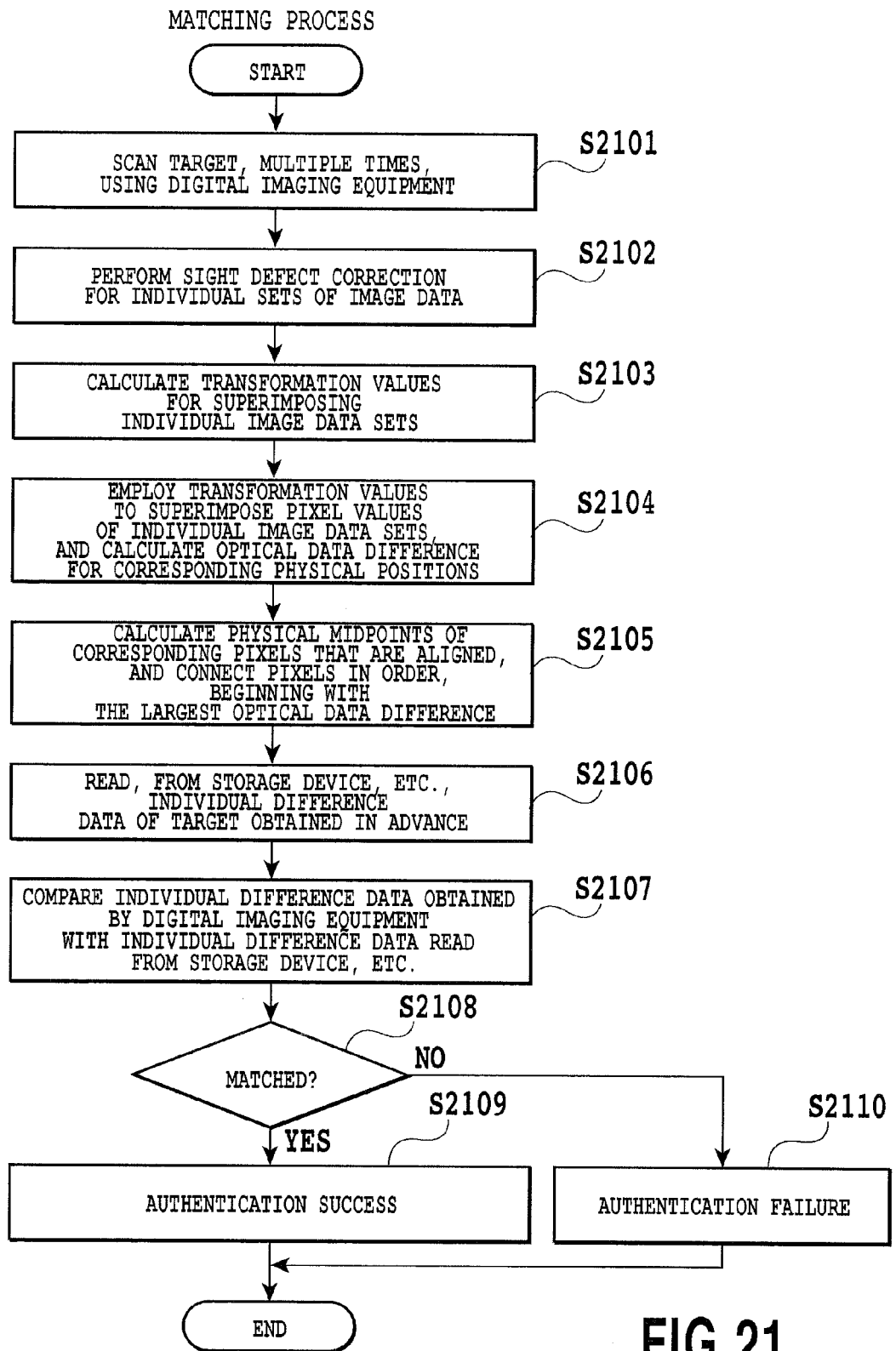
FIG. 21 is a flowchart showing the authentication processing performed for this embodiment.
Figure 23:
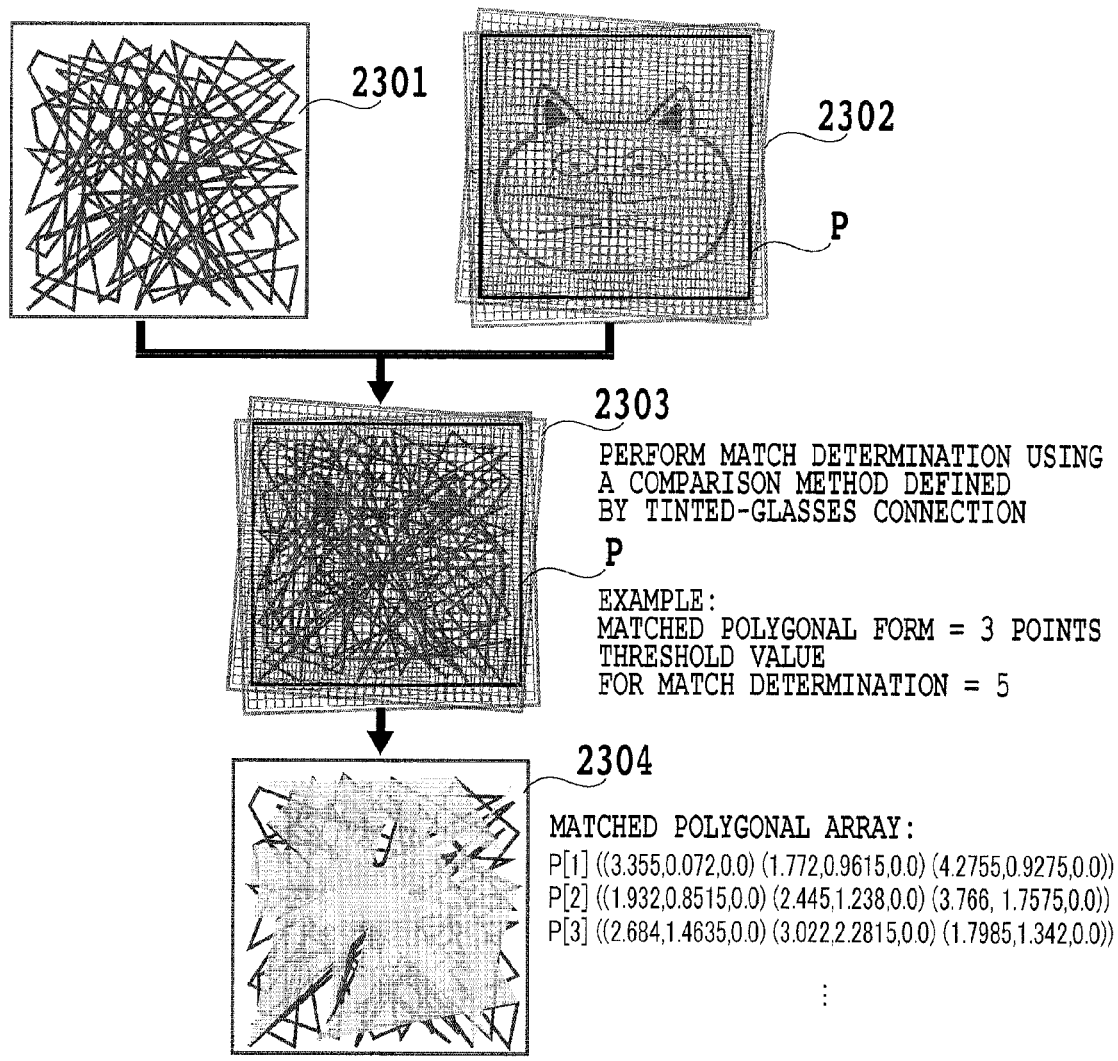
FIG. 23 is a diagram for explaining an example, for the embodiment of the present invention, wherein determination for matching is performed through authentication processing employing an individual identification pattern that has been extracted in advance.

While referring to FIGS. 8, 10 and 23, an explanation will be given for a method for authenticating a target based on individual difference data obtained above, i.e., a method for employing individual difference data to determine whether a target, such as printed matter, matches a target from which individual difference data was already extracted. First, an explanation will be given for a precondition that predetermined similarity is established in a case wherein reproducibility in the order of the reproduction instability element points, i.e., the positional information of the connection points is arranged for the same target, in the order of the strength of optical data difference, beginning with the greatest value. FIG. 21 is a flowchart showing the authentication processing performed for this embodiment.

Figure 8:
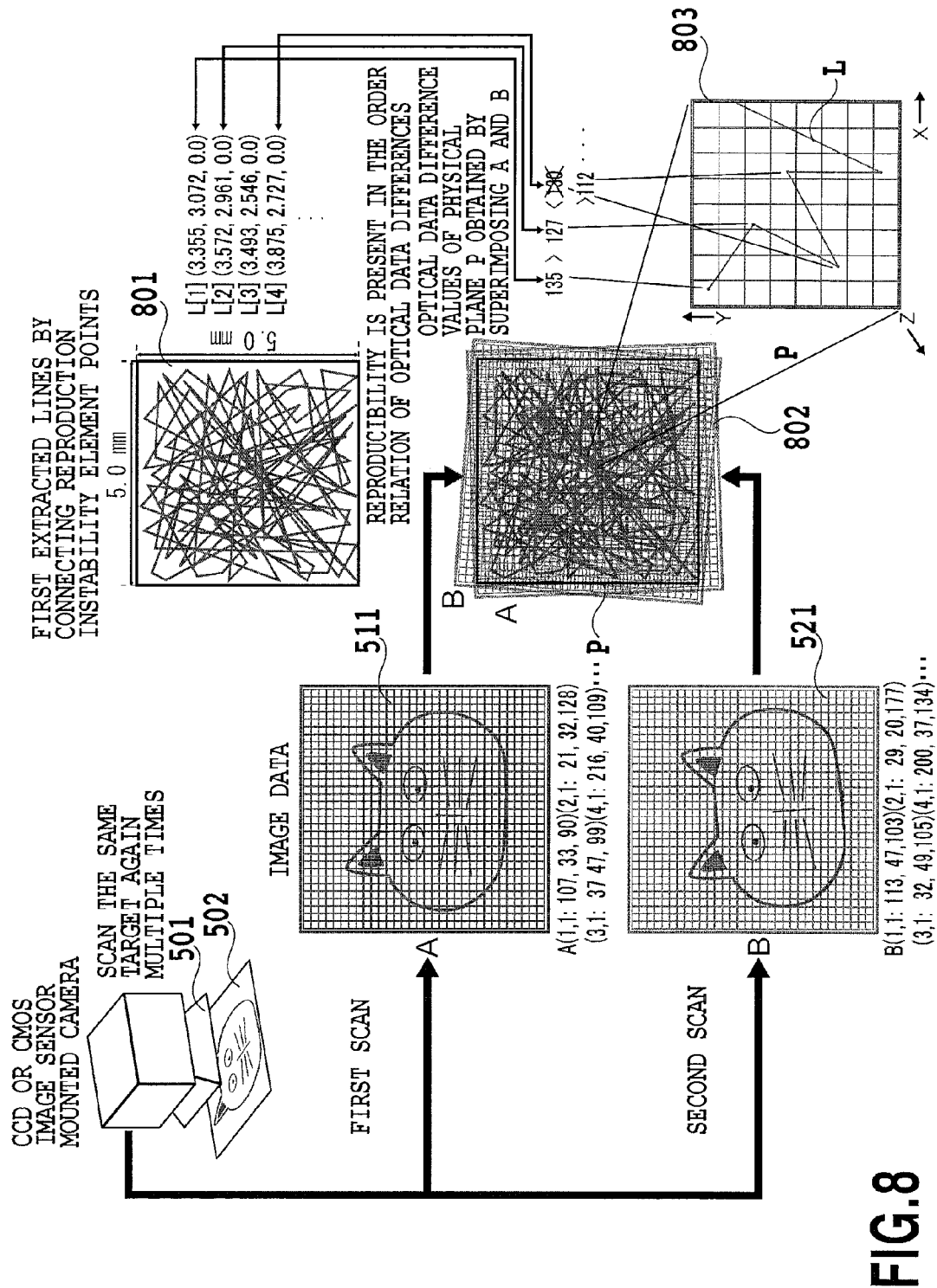
FIG. 8 is a diagram for explaining the authentication processing performed, for the embodiment of the present invention, by employing an individual identification pattern that has been extracted in advance.

As shown in FIG. 8, image data is obtained in advance by reading a target 502 using a scanner, etc., multiple times, and individual difference data, represented by connecting lines in an image 801, is extracted and stored in some storage means, such as a database. In this case, the target is further scanned by the camera 501 multiple times, and as shown in an image 802, the one-stroke line pattern in the image 801 extracted in advance is employed to overlay the pixels at the connection positions of the one-stroke line pattern, and an optical data difference is obtained at the positions corresponding to the pixels, or specifically, the connection positions are compared in the order of connecting lines. As a result of comparison, since the individual difference is reflected in the resolution difference, the one-stroke line images do not completely match, as shown in FIG. 8; however, as for the points of a one-stroke line pattern of the image 801 and those of the image 802, predetermined reproducibility is established for the order of reproduction instability element points and a one-stroke line pattern 803 can be obtained. Therefore, for one-stroke line patterns obtained for the same target, since reproducibility is present in the order in which the corresponding points are connected, the degree of matching for the order can be employed to determine the identify of an individual.

Here, in this embodiment, matching for a target is performed by comparing the positions of the connection points that are arranged in the descending order of the strengths of differential optical data; however, a method for comparison of one-stroke line images is not limited to this method, and various pattern comparison methods, i.e., variations on the connection comparison method, are available, such as a method for coupling the points in order, beginning with the lowest level of the reproduction instability element strength, and comparing these points. In a case wherein the present invention method is employed, since a limitation of a target to be authenticated is enabled by using parameters and a comparison method that are appropriate for a target to be captured, these parameters and a comparison method are together called a tinted-glasses connection, or a connection and comparison setup. For a tinted-glasses connection, the following various parameters are employed, and a connection type for a one-stroke line image is determined in accordance with a set of the parameters. An example for the tinted-glasses connection is shown in FIG. 17. Further, the connection types for a one-stroke line image are shown in FIGS. 18 and 19. In FIG. 18 the index type is shown, and in FIG. 19 the sequence type is shown. The parameters employed for the tinted-glasses connection are: ((the order (forward or reverse) of reproduction instability element strengths)(the least required connection distance)(the threshold strength value) (change in strength)(the number of connection points) (the scan area size)+α)).

Further, a one-stroke line image formation example that corresponds to these parameters is as follows.

Index type "one-stroke line image":
((starting point: three dimensional Cartesian coordinates XYZ) (starting point: a three dimensional vector) (a distance)+the number of points x ((a three dimensional vector) (a distance))
Sequence type "one-stroke line image":
The number of points x three dimensional Cartesian coordinates XYZ That is, various comparison methods can be employed, such as one for employing the ascending order, instead of the descending order, which will be described in detail below, one for skipping reproduction instability element points, for which the distances do not reach the least required connection distance, one for skipping elements, for which the change in strength is equal to or lower than a predetermined level, one for connecting points until the number of connection points reaches the maximum value, or one for connecting points only within the range of a designated area. Furthermore, the most appropriate tinted-glasses connection can be employed in accordance with a material on which a target is presented and a method for representing the target, i.e., a printing method and an ink type used for the target, and it is also required for the actual authentication process to determine in advance which tinted-glasses connection should be employed. Therefore, in a database, etc., used to store individual difference data described above, associated information concerning tinted-glasses connections to be employed is stored in correlation with the individual difference data by using a predetermined method, so that the authentication process can be performed, based on the individual difference data, under optimal conditions. The associated information can include not only information for the tinted-glasses connection, but also other useful information employed when the identity of an individual is to be determined based on the individual difference data.

Next, a method for determining the identity, i.e., a method for determining reproducibility for the order of reproduction instability element points, will be described. A specific process example shown in FIG. 23 is employed for this explanation. For match determination for a target to be authenticated, first, a one-stroke line pattern 2301 extracted and registered at first is traced along the connection order to examine whether a predetermined relationship has been established for the differential values of optical data of pixels, for which the individual connection positions correspond to the physical portions of the pixels of image data 2302 that have been obtained and superimposed for authentication. In this case, match determination is performed by using a comparison method defined based on the tinted-glasses connection. For example, in a case wherein a matched polygonal shape is formed of three points, every three connection points of the one-stroke line pattern, from the beginning, are examined to determine whether the order relation is established for the corresponding points, and when the correspondence of the three points is established, the pertinent polygon is regarded as a matched form to increment the number of polygonal shapes. Then, examination for the correspondence relation is sequentially performed until the end point of the one-stroke line image. As a result, matched forms are stored in a matched polygon array, and in a case wherein the number of matched forms is equal to or greater than a threshold value for match determination, it is determined that authentication has been successful. Of course, a search of matched polygons may also be performed until a predetermined count is reached, and when the count value goes beyond the predetermined count, it may be assumed that authentication has successful and that the processing may be terminated.

Figure 9:
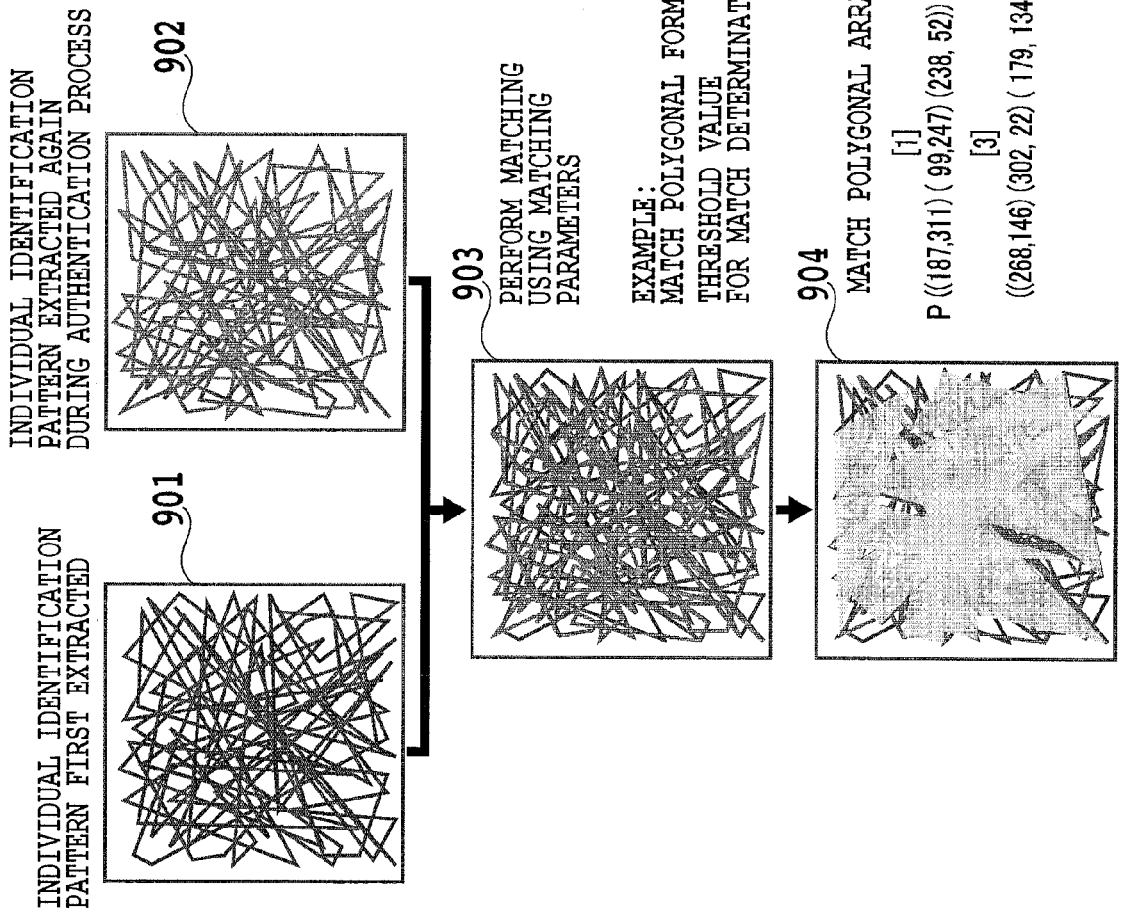
FIG. 9 is a diagram for explaining an example, for the embodiment of the present invention, wherein a determination for matching is performed through the authentication processing performed by employing an individual identification pattern that has been extracted in advance.

In this embodiment, during the authentication process, instead of generating connected lines, the connected lines that were registered are traced for image data obtained by scanning for authentication, and the number of matched sequences are counted. However, during the authentication process, connected lines may also be generated and be compared with each other to determine the identify. A specific matching process using polygons will now be described while referring to FIG. 9. Specifically, as a method for comparing one-stroke line images, every three points of each one-stroke line image, from the beginning, are employed to obtain a correlation of them, and when three points of two image are matched, it is assumed that a matched polygon is present, and the number of matched polygons is incremented to determine the identity. Matching using polygons is also performed by comparing a one-stroke line pattern indicated by an image 902, which represents individual difference data that was again extracted at the time of authentication, with a one-stroke line pattern indicated by an image 901, which represents individual difference data that was extracted and registered first. Comparison and match determination for the two one-stroke line patterns are performed in accordance with one tinted-glasses connection that includes the above described connection order, and triangles are formed using three contiguous points (matched polygonal forms are present). Then, as shown in a matching image 903, a check is performed to determine whether correspondence has been established for every three points of the one-stroke line images, from the beginning, and in a case wherein the correspondence of the three points has been established, the number of matched polygons is counted. The correspondence is sequentially examined in this manner until the endpoint of the one-stroke line image. As a result, the matched forms are stored in a polygon array 904, and in a case wherein the number of matched forms is equal to or greater than a threshold value for match determination, it is determined that the authentication has been successful.

<Identity Match Probability>

An explanation will now be given for how the match probability that was obtained in a case wherein all of the pixels were simply connected in order of (resolving) reproduction instability strength points, without repetitively passing these points, is to change in a case wherein the number of points is reduced, in correlation with the physical size of a target to be authenticated, which is obtained with the resolution of a digital imaging apparatus, and the size (pixel size) of image data that is collected by focusing. Here, two images are read as data, and the same resolution is employed.

Based on the authentication method, one-stroke line images are finally changed to data representing a correlation of coordinates only, and the probability for matching the one-stroke line images by chance is given by the following expression. When the sizes of an image in the x, y and z directions after trimming are denoted by Xt, Yt and Zt, a degree of freedom for each reproduction instability element point is Xt×Yt×Zt in a case wherein the instability of the element point is uniform, and when the total of reproduction instability element points is denoted by N, a probability that an arbitrary point on image data is a reproduction instability element point is $$\frac{1}{X_t \times Y_t \times Z_t} \quad [\text{Ex. 1}]$$

In a case for the matching of one-stroke line images, when the sizes of an image at the time of registration are $X_r$, $Y_r$, and $Z_r$, and when it is assumed that the physical portions consonant with the pixels are regarded as the areas of corresponding pixels of data for another image, a match probability of the arbitrary point is $$\frac{N}{X_t \times Y_t \times Z_t} \times \frac{1}{X_r \times Y_r \times Z_r} \quad [\text{Ex. 2}]$$

In the case wherein a matched polygon is a shape formed by three points, a probability that all of the first three points are matched between the images is $$\frac{N}{X_t \times Y_t \times Z_t} \times \frac{N-1}{(X_t \times Y_t \times Z_t)-1} \times \frac{N-2}{(X_t \times Y_t \times Z_t)-2} \times \quad [\text{Ex. 3}]$$
$$\frac{1}{X_r \times Y_r \times Z_r} \times \frac{1}{(X_r \times Y_r \times Z_r)-1} \times \frac{1}{(X_r \times Y_r \times Z_r)-2}$$

When this expression is employed for the second and following sets of three points, an identity match probability R for a case wherein the number of matched forms is P is $$R = \prod_{i=0}^{P-1} \left\{ \frac{N-3i}{(X_t \times Y_t \times Z_t)-3i} \times \right. \quad [\text{Ex. 4}]$$
$$\left. \frac{N-3i-1}{(X_t \times Y_t \times Z_t)-3i-1} \times \frac{N-3i-2}{(X_t \times Y_t \times Z_t)-3i-2} \right\} \times$$
$$\prod_{i=0}^{P-1} \left\{ \frac{1}{(X_r \times Y_r \times Z_r)-3i} \times \frac{1}{(X_r \times Y_r \times Z_r)-3i-1} \times \right.$$
$$\left. \frac{1}{(X_r \times Y_r \times Z_r)-3i-2} \right\}$$

Further, in a case wherein the number N of reproduction instability element points connected to form a one-stroke line image is employed as the total number of pixels of image data, $$R = \prod_{i=0}^{X_t \times Y_t \times Z_t - 1} \left\{ \frac{1}{(X_r \times Y_r \times Z_r)-3i} \times \right. \quad [\text{Ex. 5}]$$
$$\left. \frac{1}{(X_r \times Y_r \times Z_r)-3i-1} \times \frac{1}{(X_r \times Y_r \times Z_r)-3i-2} \right\}$$

It is obvious that, as the number of points to be connected is reduced, a probability that the one-stroke line images are matched by chance is increased. When the accuracy for determination of authentication is increased, matching of a predetermined number or more of connection points should be provided as a requirement. Furthermore, when the number of contiguously matched points to form a polygon is increased from three, the number of mathematical operations in { } in [Ex. 5] is increased, and the probability of matching by chance is reduced, so that this method can also improve the authentication accuracy. Furthermore, it is self-evident that, in [Ex. 3], a probability of matching only the first and the third points is $$\frac{N}{X_t \times Y_t \times Z_t} \times \frac{N-1}{(X_t \times Y_t \times Z_t)-1} \times$$
$$\frac{N-2}{(X_t \times Y_t \times Z_t)-2} \times \frac{1}{X_r \times Y_r \times Z_r} \times \frac{1}{(X_r \times Y_r \times Z_r)-1} \quad [\text{Ex. 6}]$$

and a probability of matching by chance is increased.

According to the example explained above while referring to FIG. 9, a threshold value of five matches is employed for the number of matched polygons formed of three points, and when matches equal to or greater than the threshold value are found, it is determined that the authentication has failed. It should be noted that the optimal threshold value can be determined in accordance with the characteristics of a target to be authenticated, i.e., in accordance with a material type and a printing method that were employed.

Example

FIG. 1 is a system configuration diagram for an authentication system according to one embodiment of the present invention. An authentication system 100, according to this embodiment, is an apparatus that includes a CPU 101, a ROM 102, a RAM 103 and various interfaces for external devices, to which a scanner 110 for reading a target and a display device 120 for displaying the results can be connected. Of course, a scanner for scanning a target, which is required for the present invention, may be incorporated in the apparatus, and as another function, a printer, for outputting the results, may be included, or the apparatus may be connected to a network to exchange data with a database. Specifically, this system may be employed as a dedicated apparatus for authentication, and various known system configurations for this technical field are available, such as the connection of a scanner to a mobile phone equipped with a camera, or to a laptop computer or a personal computer.

Figure 2:
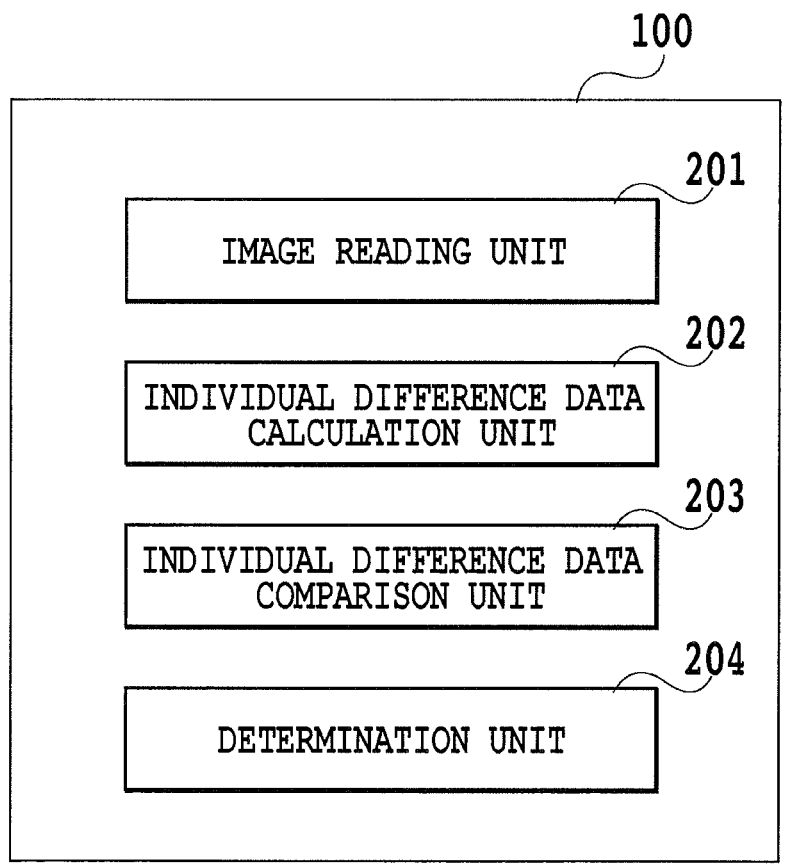
FIG. 2 is a functional block diagram for the embodiment of the present invention.

FIG. 2 is a functional block diagram for the embodiment of the present invention. In this embodiment, a software program is executed by the CPU 101 to perform various functions required to realize the present invention, and the processing may also be performed for the individual functional blocks shown in FIG. 2. That is, the processing is performed by an image reading unit 201, for scanning a target and extracting an image, an individual difference data calculation unit 202, for calculating individual difference data based on the obtained image, an individual difference data comparison unit 203, for comparing the obtained individual difference data, and a determination unit 204, for making a final determination as to whether the target should be authenticated. In this embodiment, the processing is performed by the functional blocks shown in FIG. 2; however, the blocks are not limited to those shown, and the functional blocks may be divided to provide more blocks, or a plurality of these functional blocks may be combined to form different functional blocks for performing the processing.

The processing performed in this example will be described while referring to FIGS. 3, 10 and 12. In this example, since a specific target is to be compared with a target that has been registered in advance, or has been set forth as a matching target, and the authentication process, i.e., determination as to whether the two targets are matched is to be performed, it is assumed for this processing that individual difference data previously explained was obtained in advance and is stored in a specified area. The individual difference data obtained in advance may be stored in memory provided for the apparatus, such as the ROM 102 or the RAM 103, or may be obtained from an external storage device or via a network.

Figure 3:
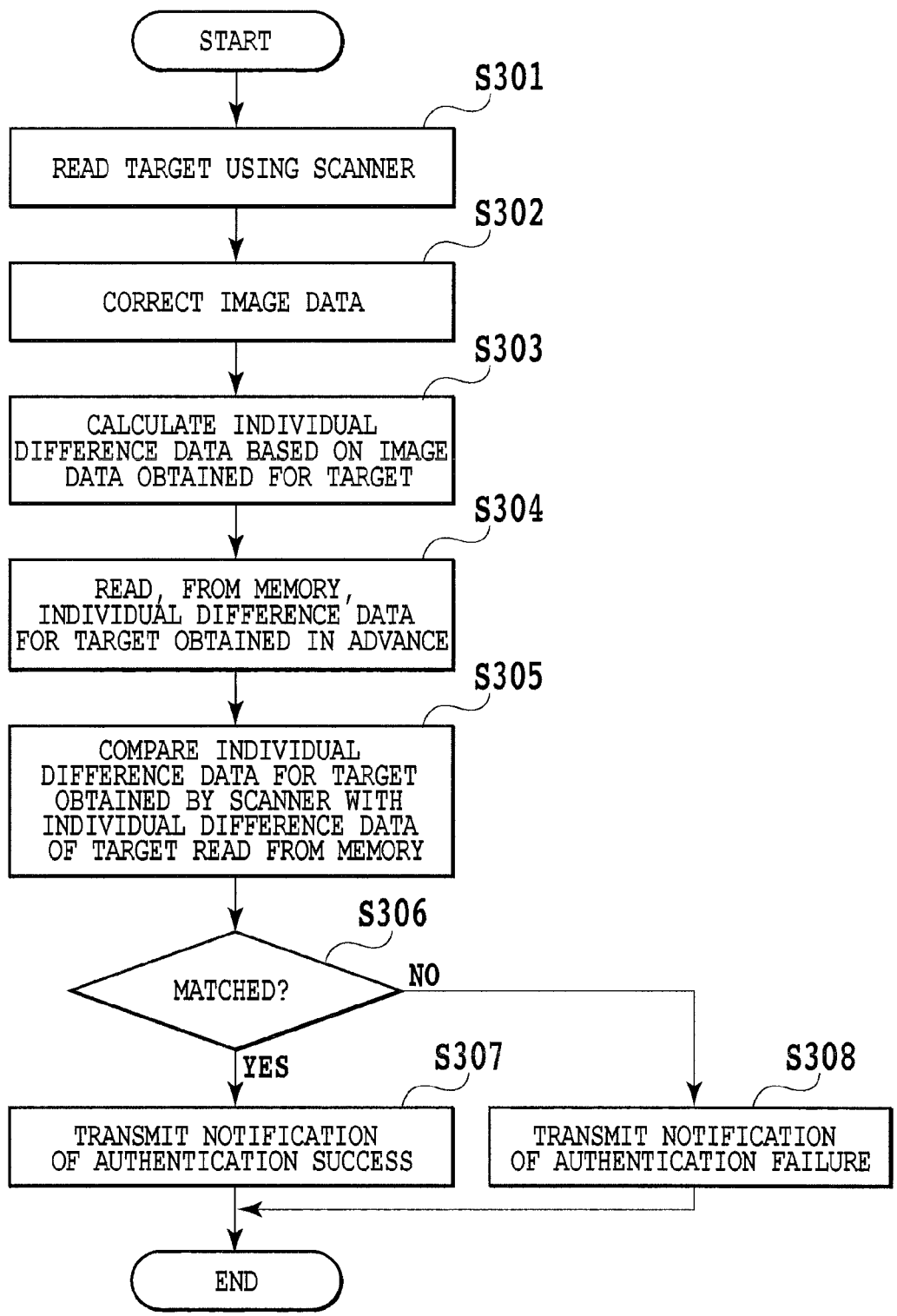
FIG. 3 is a flowchart showing an authentication process performed for the embodiment of the present invention.

FIG. 3 is a flowchart showing the authentication processing performed for the embodiment of the present invention. The image reading unit 201 employs the scanner 110 to scan a target, and outputs image data (S301). Since the scanner 110 employed for reading generally differs from a reading apparatus that was used to calculate individual difference data in advance, a predetermined correction is performed for the thus obtained image data to remove a reading difference (S302). In this example, standard instruction data is employed to obtain, in advance, correction values that are used for normalizing the image resolving process, such as correction of the location of an imaging apparatus, etc., employed to calculate individual difference data, correction of the light-receiving color temperature for a sensor, white balance correction, ISO speed correction, lens distortion correction, correction of a chromatic aberration, concentration correction, correction of the amount of light for illumination, spectrum correction and conversion that is consonant with the type of imaging apparatus. When a filter provided using these correction values is employed for image data that is obtained, the individual pixel values of image data can be changed, and regardless of the configuration of the imaging apparatus, the reading of image data is enabled under a predetermined condition; however, the method is not thereby limited, and the exchange of correction value data may also be performed while the data are stored in a storage device, or another method well known to this technical field may be employed to generate image data.

Figure 11:
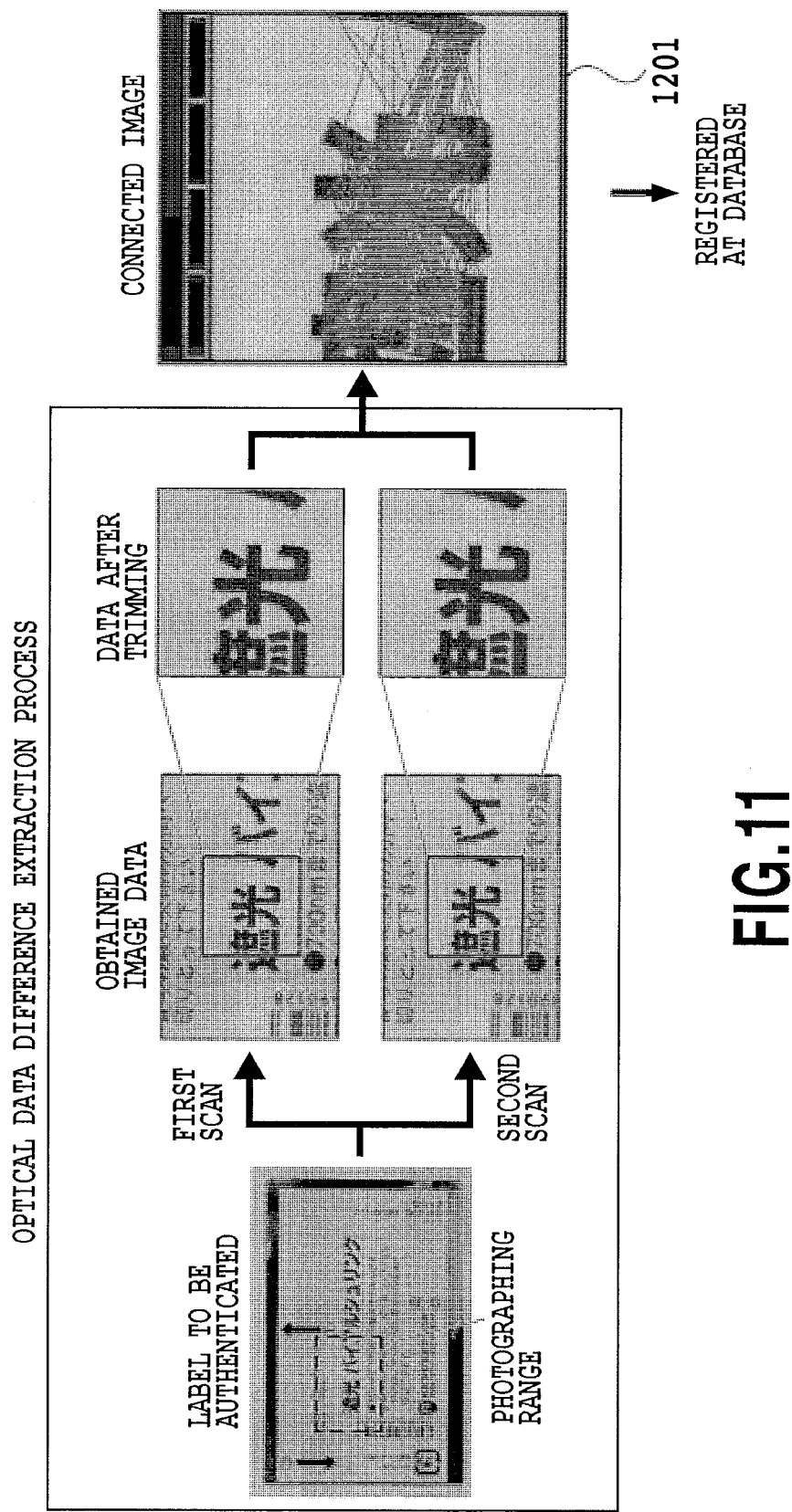
FIG. 11 is a diagram for explaining the process for correcting a specific example for which the embodiment of the present invention is applied.

Generally, the authentication of a target can be performed by using only part of an image. FIG. 11 is a diagram for explaining the extraction process for a specific application example for the embodiment of the present invention. As shown in FIG. 11, a label attached to a product is a target, and is one type of printed matter. As a target, an arbitrary selected area of the label is scanned twice to obtain two images, and a one-stroke line image is generated based on the two images obtained (S303). Then, a one-stroke line image obtained in advance is read from the memory (S304), and is compared with the one-stroke line image generated at S303, as shown in FIG. 12 (S305). FIG. 12 is a diagram for explaining the match determination processing for the specific application example of this embodiment of the present invention. For comparison, when the connection and comparison method described above, for example, which uses polygons, and when a match is found at a predetermined probability (S306), a notification that authentication was successful is transmitted (S307), or when a match is not found at a predetermined probability (S306), a notification that authentication failed is transmitted (S308). In this example, the printed portion of a label has been employed for determination of authentication success; however, the method is not limited to this, and any other method well known to this technical field can be employed. For example, the impression of a seal, which is affixed as an indicator to a label in advance, may be employed as a target, and when color information can be obtained from a surface portion of a container, such data can be employed.

In this example, the following apparatus, settings, etc., were employed, and extraction of an individual difference and authentication of the identity were performed for a medical label. A label to be authenticated was a film based label vertically 44.0 [mm]×horizontally 74.0 [mm], and neither a special ink nor a special process were provided for printing the label. A one-stroke line image was the sequence type, and the imaging equipment was a CCD digital camera having a pixel total of 10,750,000 pixels, for which the settings were manual focus, a light sensitivity of ISO 100, an aperture of F8, a shutter speed of 1/20 [s], and an image size (W×H) of 3872× 2592 [pixels], and the number of times to be photographed was twice.

Specifically, the following processing was performed to extract the characteristics for an individual difference.

(1) As shown in FIG. 11, a target label was set up for a photographing range of vertically 15.5 [mm]×horizontally 23.2 [mm], and was photographed twice, under the above conditions, to obtain image data for two images.

(2) The two sets of image data thus obtained were trimmed to obtain like sizes, 8.7 [mm]×8.7 [mm], and optical data difference D(x,y), defined by the following expression, was calculated based on the two sets of image data. Assume that image data 1 is denoted by g1 (x,y) and image data 2 is denoted by g2 (x,y). X and Y are, respectively, a set of x coordinates and a set of y coordinates of image data.

$$D(x, y) = \sum_{(x,y)\in(X,Y)} |g1_R(x, y) - g2_R(x, y)| + |g1_G(x, y) - g2_G(x, y)| + |g1_B(x, y) - g2_B(x, y)|$$ [Ex. 7]

It should be noted that g1R(x,y) represents the R component of RGB values, and this applies to the other values.

(3) The following conditions were employed to generate a one-stroke line image. Based on a connection in the descending order for the reproduction instability elements, the least required connection distance of 62 μm, the threshold value of 10.0 for the reproduction instability strength, and the number of connection points of 250, a one-stroke line image 1201 shown in FIG. 11 was generated by using the optical data difference obtained above.

(4) The thus obtained one-stroke line image 1201 was stored in a database as individual difference characteristics of the target to be authenticated in a database, together with associated information (the settings of the apparatus employed, one-stroke line image generation conditions, etc.).

Figure 12:
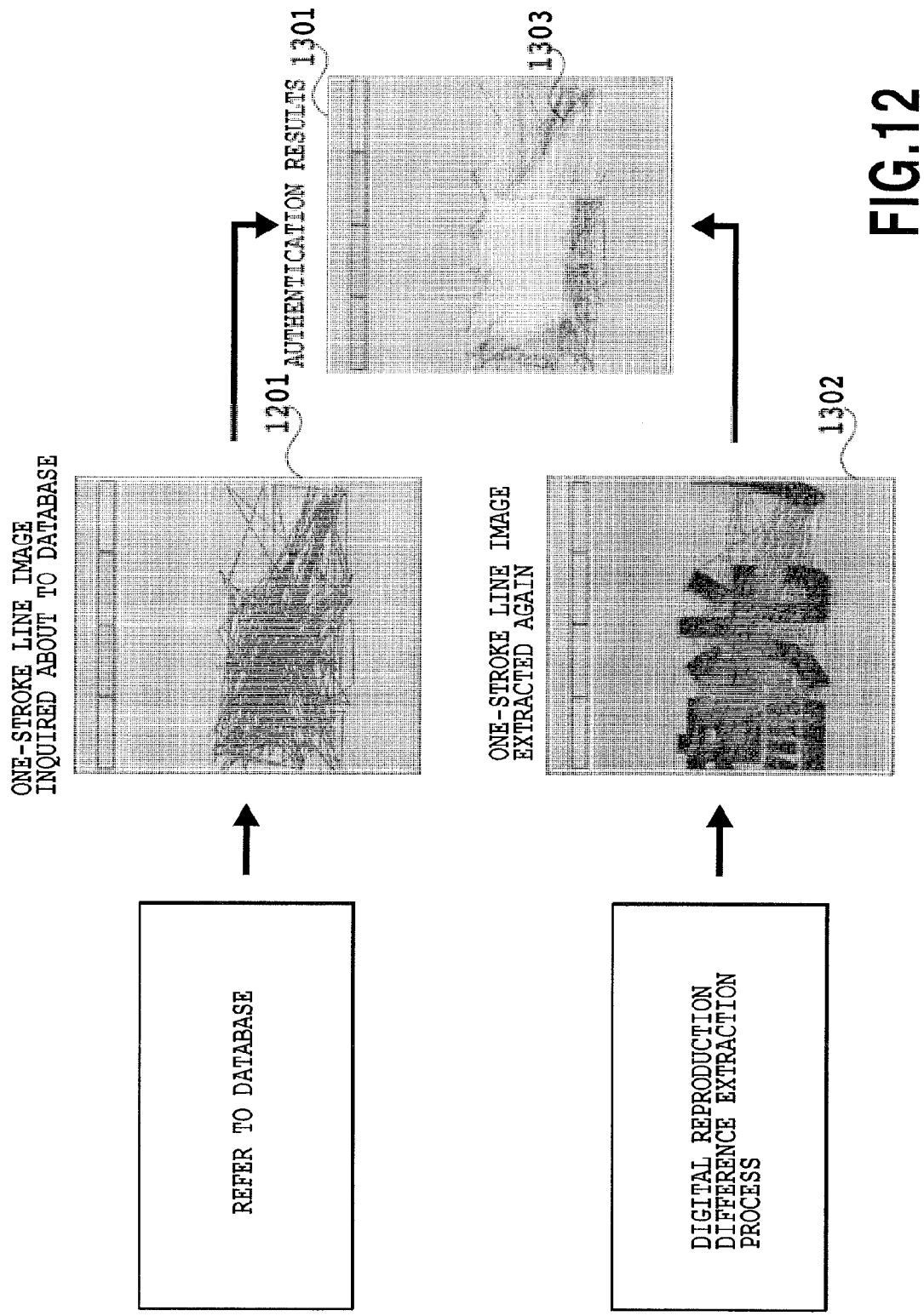
FIG. 12 is a diagram for explaining a matching process performed for specific examples for which the embodiment of the present invention is applied.

(5) Under the same conditions as those in (1), the image of the target was captured two times again, and a one-stroke line image 1302 shown in FIG. 12 was also generated.

(6) Based on associated information, the database was referred to for the one-stroke line image, and matching was performed, beginning with the first connection points, between the one-stroke line image 1201 retrieved from the database and the one-stroke line image 1302 generated at this time. The matching conditions were set as follows: the match shape should be formed of three points, the number of polygonal forms least required for match determination should be four.

(7) The authentication result 1301 shown in FIG. 12 was obtained by matching. As shown in FIG. 12, since the number of polygons 1303 that matched were 26, which satisfied the condition that the number of match polygonal forms should be four or more, it was determined that this one-stroke line image is identical to the one-stroke line image that was registered, and it could be ascertained that authentication of the target was successful.

FIGS. 13 to 16 are diagrams for explaining another specific application example according to the embodiment of the present invention. For the example shown in FIG. 13, a tablet is employed as a target. Generally, a mark, a name, etc., indicating the identity of a tablet is printed on the surface of the tablet. When the present invention is employed for the printed portions, the individual tablets can be identified. For example, when individual difference data is prepared during a manufacturing process, it is possible to uniquely specify a factory, and a lot and a time that individual tablets were produced, and various utilizations can be expected. Furthermore, when color information can be obtained from the surface of a tablet, identification for a tablet even without a mark, etc., being printed is enabled by employing the preset invention.

Figure 13:
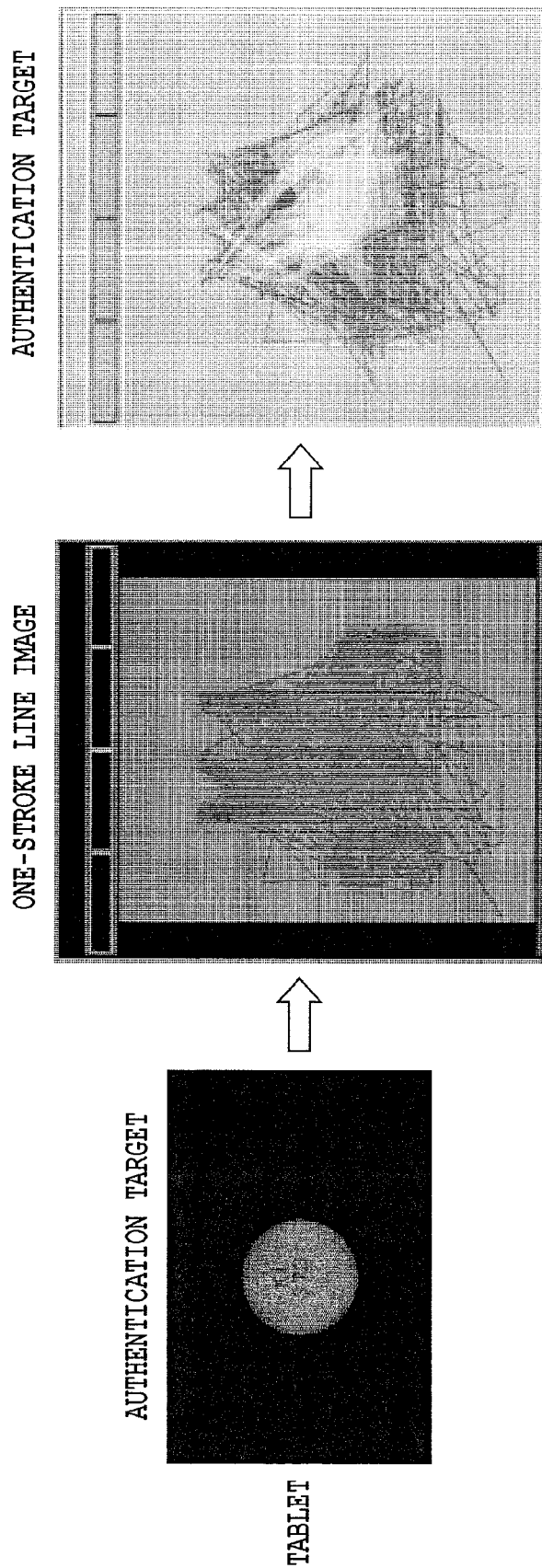
FIG. 13 is a diagram for explaining another specific example for which the embodiment of the present invention is applied.

A specific authentication process will be described in the same way as provided for a medical label. As shown in FIG. 13, a white round tablet with a grey mark imprinted in a vertically 7.5 [mm]×horizontally 7.5 [mm] white background was employed. This tablet is a medicine commercially available on the market. The same imaging equipment as used for the medical label described above was employed, and as imaging conditions, only the shutter speed was changed to 1/50[s], and the same values were employed for the other settings. Further, the number of times photographing was performed was also the same, two times.

Under the above described conditions, individual difference characteristics were extracted in the following manner.

(1) A target tablet was set up for a photographing range of vertically 15.5 [mm]×horizontally 23.2 [mm], and was then photographed two times, under the above described imaging conditions, and image data for two images were obtained.

(2) The two sets of image data were trimmed to obtain the sizes of vertically 4.2 [mm]×horizontally 3.5 [mm], and the resultant two sets of image data were employed to obtain a digital reproduction difference in the same manner as performed for the medical label described above.

(3) The tinted-glasses connection was provided to set the sequence type for forming a one-stroke line image, the descending order for connection, the least required connection distance of 63 μm, threshold value of 20.0 for the reproduction instability strength, and 250 as the number of the connection points, and based on these conditions, a one-stroke line image was generated. The obtained one-stroke line image is shown in FIG. 13.

(4) The obtained one-stroke line image and associated information were stored in a database, and authentication registration was completed.

(5) Under the same conditions as those in (1), the target was photographed twice again to extract a one-stroke line image.

(6) Similarly, matching was performed, beginning with the first connection points, between the currently obtained one-stroke line image and the one-stroke line image that was read from the database. The matching condition was so set that a matching shape should be formed of three points and the number of polygonal forms least required for match determination should be four.

(7) The matching results are shown in FIG. 13. The number of matching shapes is 13, which indicates that authentication was successful.

Figure 14:
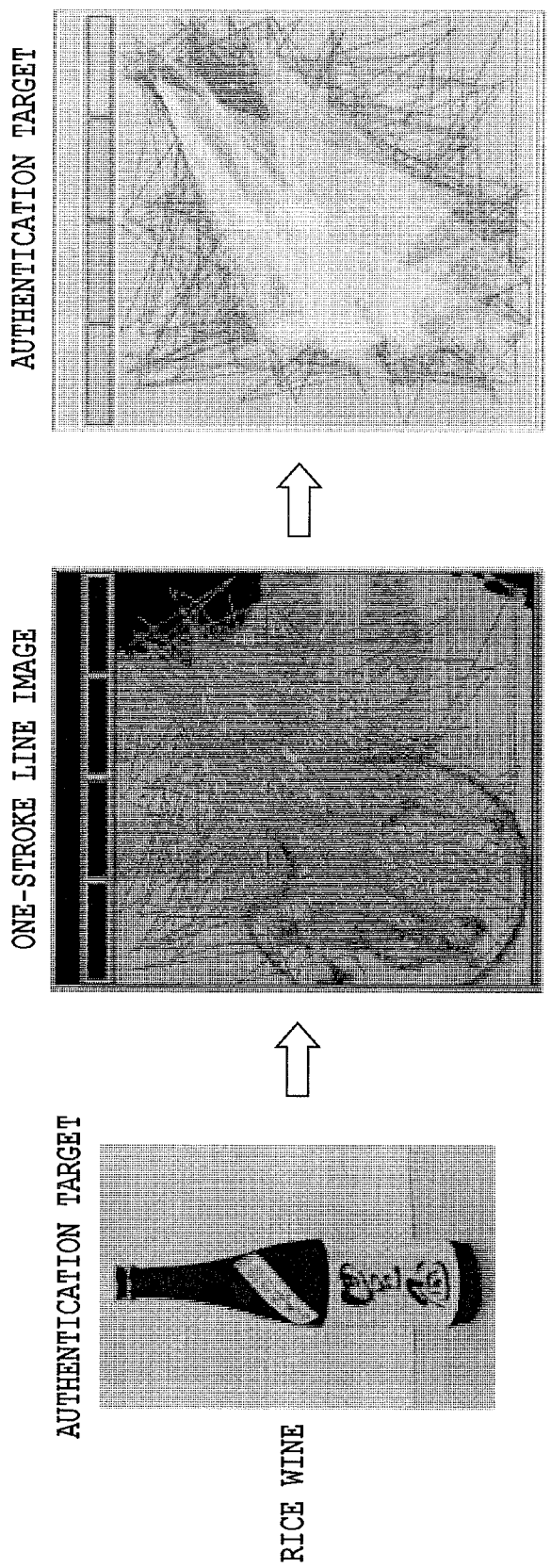
FIG. 14 is a diagram for explaining an additional specific example for which the embodiment of the present invention is applied.

An example shown in FIG. 14 is an example for which the present invention was applied for labels of Japanese rice wine, wine, etc., and a signature portion or a seal portion, for example, on a label may be employed as a specific portion to read, or even when a portion to read is not especially designated, the area to be read can be easily identified. Furthermore, scanning may also be performed while an image represented by affixing a seal on the label is employed as a target, and the authentication process may be performed.

Figure 15:
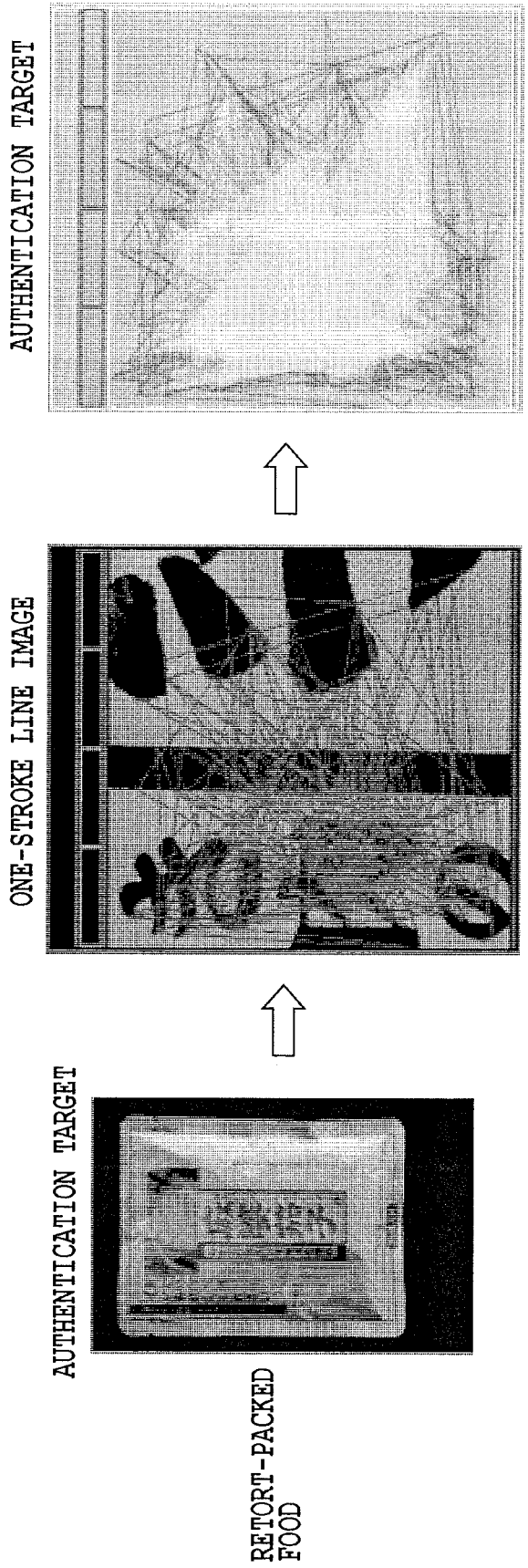
FIG. 15 is a diagram for explaining a further specific example for which the embodiment of the present invention is applied.

For an example shown in FIG. 15, the printed portion of a retort-packed food is employed, and so long as a target can be read by a scanner, etc., and an image for the target can be generated, the present invention can be applied for the target, regardless of which material and which printing method is employed for the target.

Figure 16:
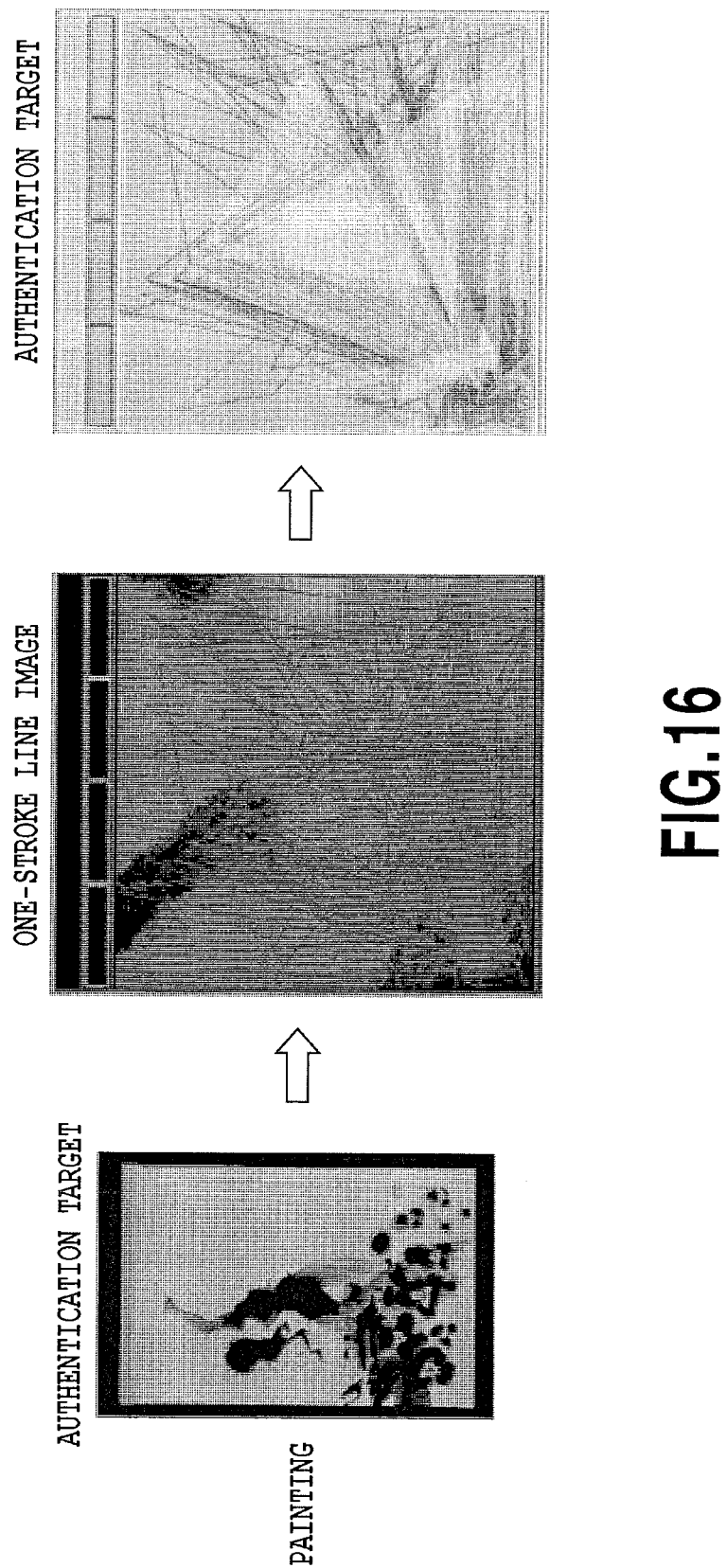
FIG. 16 is a diagram for explaining yet one more specific example for which the embodiment of the present invention is applied.

For an example shown in FIG. 16, the present invention is employed for the identification of a painting, and since the overall area of the target is printed matter, an arbitrary portion is available for the use of the present invention. Further, even for such a target that has been greatly deteriorated over time, since the connection points that match at a predetermined ratio are kept and are not lost, the authentication accuracy can be maintained.

In the above examples, except for a tablet, a specific portion to be employed for authentication should be designated; however, such a portion can be designated by using a method well known in this technical field, for example, by determining the right end portion in advance, or by transmitting information about an area that has been selected.

The invention claimed is:

1. An authentication system comprising:
   storage means for storing, as individual difference data used to uniquely identify an object to be authenticated, connected lines that are generated in such a manner that an optical data difference is calculated at positions corresponding each other among a plurality of sets of digital data obtained by scanning and resolving the object, and are coupled in order, as connection points, based on the amount of the obtained optical data difference; and
   digital imaging means for, when the digital imaging means has obtained digital data through scanning, multiple times, the object to be authenticated under predetermined configuration requirements, comparing a plurality of sets of the thus obtained digital data to match positions for mapping the object to be authenticated; reading, from the storage means, the connected lines for the individual difference data; and when it is determined that a predetermined relationship is established between the obtained optical data difference at the connection points and the order of the connected lines, determining that authentication is successful.

2. The authentication system according to claim 1, wherein
   a resolution of the digital imaging means is included in configuration requirements for the digital imaging means; and
   the resolution of the digital imaging means is lower than a particle size used to form an image of the target to be authenticated.

3. The authentication system according to claim 1, wherein the transformation value calculation means sequentially scans the target to be authenticated a plurality of times.

4. The authentication system according to claim 1, characterized by further comprising:
   correction means for employing predesignated information to perform correction for normalizing a difference in image data caused by a difference in configuration requirements for the digital imaging means.

5. The authentication system according to claim 1, wherein
   the storage means also stores a line connection comparison setup, including parameters and comparison methods, to be used for comparison of connected lines; and
   the individual difference data extraction and determination means employs the comparison setup stored in the storage means to trace, along a polygonal line, positions of connection points on the connected lines that have been read, and determines that authentication is successful, when the obtained optical data difference indicates, with respect to the order of connection lines, a predetermined relationship that is designated in the comparison setup.

6. The authentication system according to claim 1, wherein when the obtained optical data difference indicates a descending order by a predetermined number, with respect to the order of the connection lines, the individual difference data extraction and determination means determines that authentication is successful.

7. A matching method, for an authentication system that includes storage means for storing, as individual difference data used to uniquely identify an object to be authenticated, connected lines that are generated in such a manner that an optical data difference is calculated at positions corresponding each other among a plurality of sets of digital data obtained by scanning and resolving the object, and are coupled in order, as connection points, based on the amount of the obtained optical data difference, comprising:
   when the digital imaging means has obtained digital data through scanning, multiple times, the object to be authenticated under configuration requirements for the digital imaging means, comparing a plurality of sets of the thus obtained digital data to match positions for mapping the object to be authenticated; reading, from the storage means, the connected lines for the individual difference data; and when it is determined that a predetermined relationship is established between the optical data difference at the connection points and the order of the connected lines, determining that authentication is successful.

8. The authentication system according to claim 1, wherein the storage means generates connected lines by coupling in order, as connection points, beginning with the largest obtained optical data difference, physical positions of a subject, which correspond to center positions of pixels located at the obtained corresponding positions, calculated based on a physical size of the subject that corresponds to a pixel size at the time of the scanning.

9. The authentication system according to claim 8, wherein the digital imaging means comprises:
   transformation value calculation means for comparing a plurality of sets of the thus obtained digital data and calculating translation and rotational transformation of the individual digital data sets in order to match positions for mapping the object to be authenticated; and
   individual difference data extraction and determination means for employing the obtained translation and rotational transformation to identify correlated positions of pixel arrays of the plurality of digital data sets and to read, from the storage means, the connected lines for the individual difference data for the corresponding positions, for tracing a polygonal line to search for locations of the connection points present on the connected lines that have been read, and for calculating an optical data difference of pixels on physical pixel planes that include the locations of the connection points, and that are superimposed, and when it is determined that a predetermined relationship is established between the obtained optical data difference and the order of the connected lines, for determining that authentication is successful.

* * * * *